United States Patent [19]

Pleake

[11] Patent Number: 5,720,593
[45] Date of Patent: Feb. 24, 1998

[54] APPARATUS AND METHOD OF COUNTING, INSPECTING AND STACKING PLANAR FOOD PRODUCTS

[75] Inventor: Todd D. Pleake, Zillah, Wash.

[73] Assignee: Arr-Tech Manufacturing, Inc., Zillah, Wash.

[21] Appl. No.: 309,316

[22] Filed: Sep. 19, 1994

(Under 37 CFR 1.47)

[51] Int. Cl.⁶ ................................................ B65G 57/00
[52] U.S. Cl. .................... 414/789.9; 414/790.6; 414/794.4; 209/698
[58] Field of Search .................... 209/552, 698; 414/789.9, 790.6, 790.8, 794.4, 794.8; 271/146, 209, 210

[56] References Cited

U.S. PATENT DOCUMENTS

| | | | |
|---|---|---|---|
| 2,414,059 | 1/1947 | Powers | 414/790.6 |
| 2,723,606 | 11/1955 | Brockardt, Jr. et al. | 414/790.6 |
| 3,027,817 | 4/1962 | Loeffler | 414/790.8 X |
| 3,272,351 | 9/1966 | Burton et al. | 414/793.1 |
| 3,300,065 | 1/1967 | Witmer | 414/788.9 |
| 3,318,351 | 5/1967 | Werder | 414/790 |
| 3,390,619 | 7/1968 | Williams | 414/790.6 |
| 3,392,853 | 7/1968 | Mitchell et al. | 414/794 X |
| 3,406,966 | 10/1968 | Walton | 414/793.1 |
| 3,525,443 | 8/1970 | Pomar, Jr. | 414/788.9 |
| 3,812,647 | 5/1974 | Bertling et al. | 414/794.4 X |
| 3,866,741 | 2/1975 | Carbon et al. | 414/794.4 X |
| 3,888,363 | 6/1975 | Erekson | 414/794.4 X |
| 3,908,835 | 9/1975 | Lubas | 198/803.5 X |
| 3,915,316 | 10/1975 | Pomara, Jr. | 414/789 |
| 3,930,351 | 1/1976 | Ueda et al. | 414/794.4 X |
| 3,955,665 | 5/1976 | Pettis, Jr. et al. | 198/341 |
| 3,971,481 | 7/1976 | Longenecker et al. | 414/790 |
| 4,006,831 | 2/1977 | Jimenez | 414/789 |
| 4,027,580 | 6/1977 | Sundin | 414/925 X |
| 4,405,186 | 9/1983 | Sandberg et al. | 414/786 |
| 4,530,632 | 7/1985 | Sela | 414/788.9 |
| 5,253,762 | 10/1993 | Duncan | 209/552 |

FOREIGN PATENT DOCUMENTS

| | | | |
|---|---|---|---|
| 2 062 370 | 6/1972 | Germany . | |
| 4209131 | 7/1992 | Japan | 414/794.4 |

*Primary Examiner*—Tuan Nguyen
*Attorney, Agent, or Firm*—Seed and Berry LLP

[57] ABSTRACT

An apparatus for counting, inspecting, and stacking flexible, generally planar food products such as tortillas, or the like. The apparatus has an inclined infeed conveyor with adjustable alignment guides thereon to adjust the lateral position of each tortilla as it moves to a transit conveyor. Sensors mounted on the transit conveyor count the tortillas and inspect the size and shape of the tortillas to detect any defective tortillas moving along the transit conveyor. At the end of the transit conveyor, an arcuate-shaped trajectory guide bends the tortilla into an arcuate shape as the tortilla leaves the trajectory guide and flies through a known flight trajectory to a stacking mechanism. The arcuate shape allows the leading edge of the tortilla to resist bending or folding. A rejection mechanism positioned between the end of the transit conveyor and the trajectory guide redirects any rejected tortillas detected by the sensors downward away from the trajectory guide. A stacking mechanism receives the tortillas at the end of the flight trajectory. A shaker shakes the stacking mechanism and jostles the stack of tortillas to form a tight, aligned stack. A movable stack plate supports the stack of tortillas in the stacking mechanism and moves downward incrementally as tortillas are stacked into the stacking mechanism so the flight trajectory of each tortilla is approximately the same. The stacking plate has a lowered position that deposits a stack of tortillas on a baseplate, and a stack removal device moves the stack of tortillas away from the stacking assembly to a discharge conveyor.

48 Claims, 12 Drawing Sheets ns as they come out of the processing machine to a predetermined position on the tortilla counting and stacking device. The device of U.S. Pat. No. 4,530,632 laterally aligns the randomly positioned tortillas by moving them through an entry chute and onto the conveyor belt. However, if the delivery conveyor belt moves too fast, the tortillas will back up and jam at the entry chute, resulting in misaligned or overlapped tortillas moving along the counting and stacking device. Therefore, aligning the

APPARATUS AND METHOD OF COUNTING, INSPECTING AND STACKING PLANAR FOOD PRODUCTS

TECHNICAL FIELD

The present invention is directed toward food handling equipment and, more particularly, to equipment for counting, inspecting and stacking flexible, generally planar food products, and for sorting out defective planar food products prior to stacking.

BACKGROUND OF THE INVENTION

A significant portion of the cost of manufacturing certain food products results from the labor cost in handling such products during manufacturing and packaging. For example, flexible, generally planar food products such as tortillas are generally discharged from a processing machine, e.g., an oven, a cooling device, or the like, in a randomly spaced sequence, then hand counted and stacked. The labor cost incurred in manually counting and stacking the tortillas is a significant portion of the cost of the tortillas. A further laborious and costly process is inspecting the planar food products for defects. For example, tortillas coming out of the oven may be defective because of holes in the tortillas, misshapen tortillas, or improperly sized tortillas. The tortillas are visually inspected and defective tortillas are manually removed. The remaining tortillas are then hand counted and stacked prior to being packaged. The risk of human error in manually inspecting, sorting out all of the defective products, counting, and stacking the products is high. Such human error may result in, for example, a stack of tortillas having defective products therein, a low product count, or improperly stacked tortillas that can result in damage to the product. Further, the process of manually inspecting, sorting, counting, and stacking greatly limits the speed at which the product can be packaged.

In an attempt to eliminate or reduce the expense, human error, speed limitations, and inherent limitations in the manual processing of tortillas, various devices for stacking and counting tortillas have been developed. One such device, described in U.S. Pat. No. 4,006,831, discloses an apparatus for stacking tortillas in which tortillas are placed on a moving conveyor belt, flung from that belt against aligning arms, and then fall on to a stationary tray. When a predetermined number of tortillas has been stacked on the tray, the tray is lowered and the aligning arms are pivoted downward so that the stack of tortillas can be removed by a second moving conveyor belt. The apparatus disclosed in U.S. Pat. No. 4,006,831 results in several practical limitations. First, the machine attempts to fling the tortillas horizontally from the belt. However, flat tortillas and other flat flexible food products often bend or fold in the air when they are flung horizontally. The result is an inconsistent or misaligned stack of tortillas. Furthermore, the apparatus is limited in the speed of counting, stacking, and removing the stacks from the apparatus, primarily because the stacks of tortillas are moved in the same direction as the tortillas being flung from the conveyor. A sufficient amount of time must be provided before flinging a tortilla so the stack of tortillas can be removed and cleared from the stacking area, and so the flung tortillas will not strike the stack of tortillas being cleared.

U.S. Pat. No. 4,530,632 discloses an improved counting and stacking device for tortillas which is capable of handling tortillas having a wider variety of characteristics at a faster rate than the device described in U.S. Pat. No. 4,006,831. The device disclosed in U.S. Pat. No. 4,530,632 receives tortillas on a moving belt that, after passing through a counting station, makes a 180° turn so that the tortillas are then carried on the underside of the belt. A vacuum holds the tortillas against the belt until the tortillas reach a discharge station. The tortillas then drop and stack on a stationary tray. After a predetermined number of tortillas has been dropped on the tray, a conveyor belt is lifted to engage the stacked tortillas and remove the stack from the discharge tray. The time required to remove the stack of tortillas from the tray before additional tortillas may be stacked is reduced because the conveyor belt removes the stack of tortillas in a direction opposite the direction that the tortillas' are delivered to the tray. As a result, the throughput of the device disclosed in U.S. Pat. No. 4,530,632 is higher than the prior art stacking devices.

Although the device disclosed in U.S. Pat. No. 4,530,632 represents a significant improvement in the art, it nevertheless has a number of limitations. The device has no provision for inspecting the tortillas for defects or for sorting out defective tortillas prior to stacking. As a result, the tortillas must be inspected manually prior to reaching the counting and stacking device. If any defective tortillas are overlooked, they will be stacked along with the other tortillas, because tortillas cannot be easily removed from the equipment prior to stacking. Manual removal of a defective tortilla from the stack of tortillas is possible, but the resulting stack would then contain less than the proper number of tortillas, and a replacement tortilla would have to be added by hand. This manual addition of tortillas to replace defective tortillas is a labor intensive and costly process.

Another limitation of the device disclosed in U.S. Pat. No. 4,530,632 is the throughput of the device. Although the device disclosed in the patent is markedly faster than previous devices, it is nevertheless undesirably slow for many applications. One speed limiting factor is the time needed to remove the stack of tortillas from the discharge tray before additional tortillas can be stacked on that tray. Additional tortillas cannot be dropped and stacked on the discharge tray without hitting the stack until the uppermost tortilla in the stack has been cleared from the discharge tray. However, the speed at which the conveyor belt can move the stack from the discharge tray without disturbing the stack is limited. Thus, the speed at which the stack of tortillas is removed from the apparatus determines, at least in part, the speed at which the tortillas can be delivered to the stacking area.

Another speed limiting factor arises from tolerances in the time required for a tortilla to travel on the conveyor belt from a counting station to the discharge point. The time required for a tortilla to travel from the counting station to the discharge point is theoretically a constant function of conveyor belt speed. However, tortillas traveling on a conveyor belt typically undergo some slippage on the belt because of such factors as air resistance. Since the discharge time can vary somewhat, extra time must be allowed for removal of the stacked tortillas from beneath the discharge point.

A further speed limiting factor is the alignment of tortillas from the randomly spaced sequence as they come out of the processing machine to a predetermined position on the tortilla counting and stacking device. The device of U.S. Pat. No. 4,530,632 laterally aligns the randomly positioned tortillas by moving them through an entry chute and onto the conveyor belt. However, if the delivery conveyor belt moves too fast, the tortillas will back up and jam at the entry chute, resulting in misaligned or overlapped tortillas moving along the counting and stacking device. Therefore, aligning the tortillas at the entry chute requires some time to adjust the lateral position before the tortillas are moved to the conveyor belt, and this additional time requirement limits the throughput of the counting and stacking device.

U.S. Pat. No. 5,253,762 discloses a tortilla stacking, counting, and inspecting device that represents a significant improvement in the art, although it also has a number of limitations. The device flings the tortillas from a conveyor belt to a discharge tray and a stack is formed on the discharge tray. One of the drawbacks to this device occurs in the flinging of the tortillas. The tortillas are flung in a flat, substantially horizontal position and a leading edge of the tortilla is often bent or folded under in the air before reaching the stack of tortillas on the discharge tray. The resulting stack of tortillas is dropped from the discharge tray onto a discharge conveyor belt. A further drawback occurs when the stack of tortillas is dropped on the discharge conveyor. The stack will bounce and result in a misaligned stack of tortillas that must be realigned by hand.

U.S. Pat. No. 5,253,762 provided an improvement to the art by using a single optical scanner to count and to examine the tortillas for defects. The single scanner is limited because it only examines the length of a tortilla along the conveyor belt's direction of travel. The tortillas having an improper length are sorted out from acceptable tortillas. The single scanner does not inspect the width or shape of the tortilla, so misshapen tortillas can pass under the scanner, not be rejected, and be stacked with the rest of the acceptable tortillas. The stack of tortillas then must be hand sorted to remove the misshapen tortilla and re-stacked or realigned. Such hand sorting and restacking is labor intensive and greatly increases the manufacturing cost.

SUMMARY OF THE INVENTION

An apparatus for counting, inspecting, and stacking flexible, generally planar articles in accordance with the present invention overcomes the above-identified limitations of the prior art as well as other limitations experienced in the art. In a preferred embodiment, the apparatus of the present invention has an infeed conveyor that receives the planar articles at a receiving end and moves the planar articles toward a discharge end of the conveyor. Adjustable alignment guides are located on opposite sides of the infeed conveyor to position the planar articles at a predetermined lateral position as the planar articles move along the infeed conveyor toward the discharge end.

A transit conveyor is adjacent the discharge end of the infeed conveyor. The transit conveyor receives the planar articles from the infeed conveyor at a receiving end and moves the planar articles toward a discharge end adjacent a stacking device. A plurality of sensors are positioned between the receiving end and the discharge end to count the planar articles moving along the transit conveyor. The sensors also inspect the planar articles to determine whether the planar articles meet predetermined quality standards such as proper length, width, and shape.

The trajectory guide receives the non-rejected planar articles and guides them into a flight trajectory away from the transit conveyor toward a stacking assembly. The sensors are coupled to a rejection mechanism positioned at the discharge end of the transit conveyor. The rejection mechanism directs reject articles, which are detected by the sensors, downward onto a reject conveyor. A trajectory guide is positioned adjacent the rejection mechanism near the discharge end of the transit conveyor.

The preferred trajectory guide is curved upward on its sides to form an arcuate shape. As the flexible planar articles pass over the trajectory guide, the planar articles conform to the arcuate shape of the trajectory guide, so the leading edge portion of the planar article resists bending upwardly or downwardly as the planar article moves along its flight trajectory. The arcuate shape of the planar article helps assure that the flying planar article does not fold or bend before landing in the stacking assembly.

An embodiment of the present invention has an anti-jam device, including a jam sensor coupled to the trajectory guide to detect when one or more of the planar articles is blocked and creates a jam at the trajectory guide. A jam clearing device triggered by the jam sensor clears the blocking planar articles from the trajectory guide when the jam sensor detects a jam. The jam clearing device is, for example, an air nozzle attached to a pressurized air source and aimed at the trajectory guide to direct a blast of air at the trajectory guide to blow the planar articles off of the trajectory guide, thereby clearing the jam so subsequent planar articles can fly to the stacking assembly.

The stacking assembly is positioned a predetermined distance from the trajectory guide so the planar articles fly from the trajectory guide along the flight trajectory and land in a stacking assembly to form a stack of planar articles.

The stacking assembly is located above a base plate and has a housing that forms a stacking area shaped and sized to correspond to a shape and size of the planar articles, such that the stacking area receives the planar articles at the end of the flight trajectory. The housing is adjustable so the size of the stacking area can be increased or decreased to be slightly larger than the size of the planar articles being stacked. A support plate is movably positioned within the stacking area to support the stack of planar articles.

The support plate is movable between a raised position within the stacking area and a lowered position adjacent the baseplate. The support plate moves downward incrementally from the raised position as the planar articles stack onto the support plate, so the flight trajectory of each of the planar articles from the trajectory guide to the stacking area remains generally the same. In an alternate embodiment of the invention, the support plate is adapted to move downward continuously from the raised position to assure the flight trajectory of each of the planar articles remains generally the same.

A shaker is attached to the stacking assembly to shake the stacking assembly so the planar articles stacked therein are jostled. Such jostling of the planar articles forms a tight, aligned stack within the stacking assembly.

A stack removal device is located below the stacking assembly and positioned to receive the aligned stack from the support plate. The stack removal device moves the stack of planar articles away from the stacking assembly to a discharge position. A discharge conveyor below the stack assembly receives the aligned stack of planar articles at the discharge position and moves the aligned stack away from the stack removal device to a pick-up area from which the stack is picked up and bagged or moved onto a wrapping assembly.

DETAILED DESCRIPTION OF THE INVENTION

Figure 1:
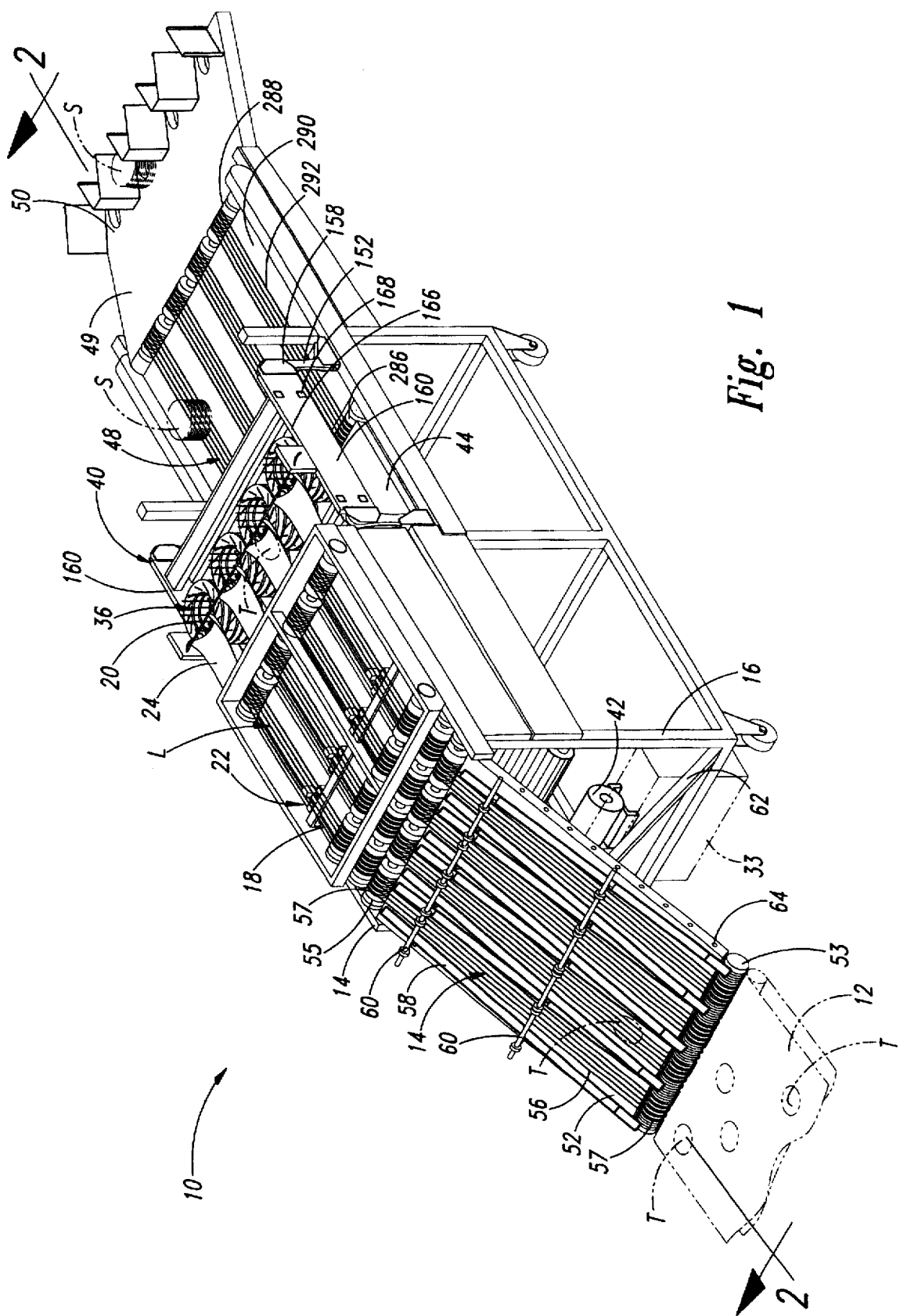
FIG. 1 is an isometric view of an apparatus in accordance with the present invention for counting, inspecting, and stacking flexible, generally planar articles, with the apparatus adjacent a forward end of a production conveyor shown in phantom.

A preferred embodiment of a device 10 in accordance with the present invention for counting, inspecting, and stacking flexible, generally planar food articles, such as tortillas T, pre-cooked pizza dough, or the like is illustrated in FIG. 1. The device 10 is positioned adjacent to a production conveyor 12, shown in phantom, that delivers the tortillas T to the device from, for example, a tortilla production line. The device 10 illustrated has four side-by-side lanes L along which tortillas T travel as they are counted, inspected, and stacked. Although the preferred embodiment uses four lanes, the device could have a greater or fewer number of lanes. The following detailed description will describe the structure along only one of the lanes, and the description is applicable for the structure along each of the side-by-side lanes.

Figure 2:
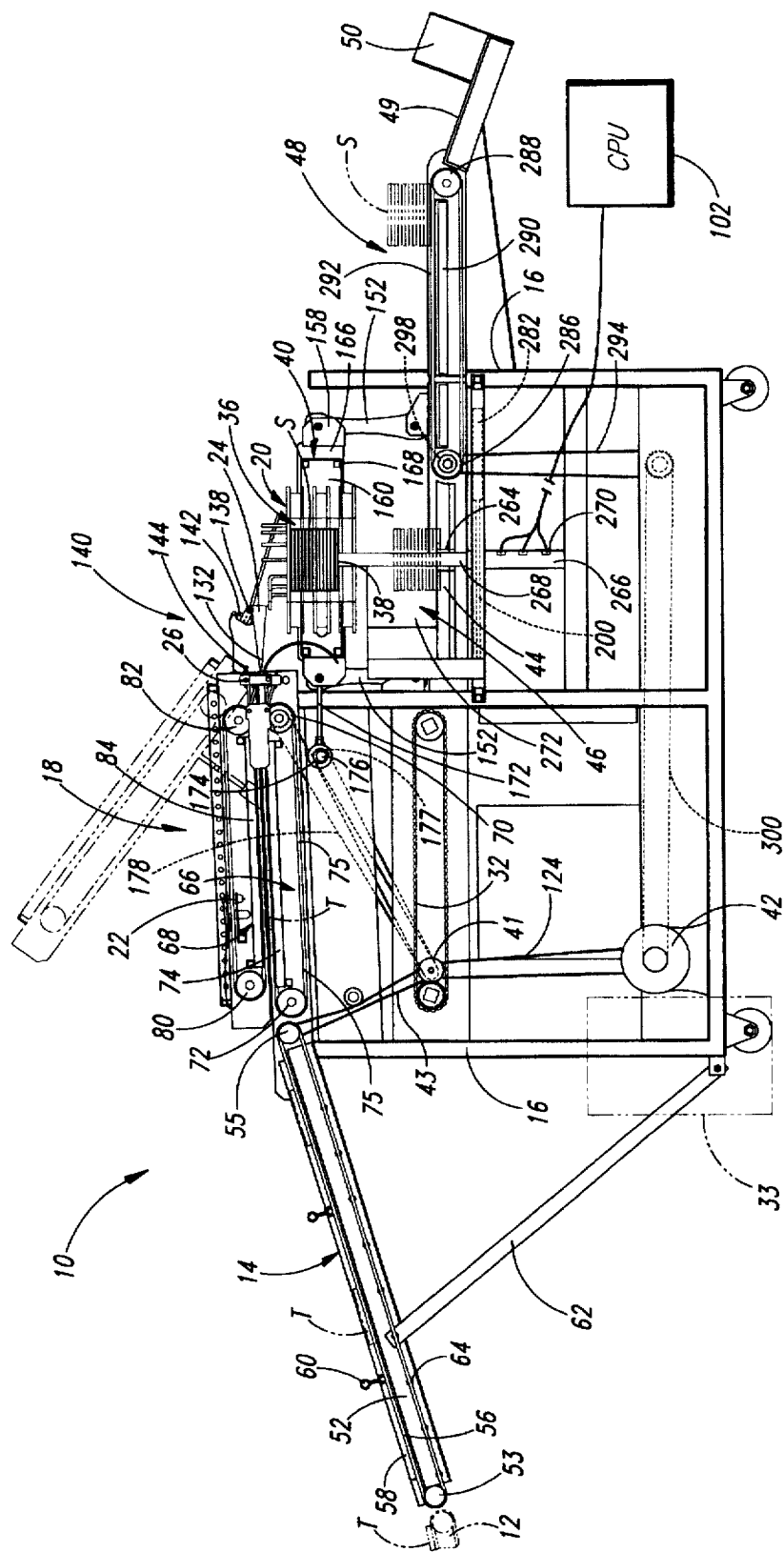
FIG. 2 is a cross-sectional view taken substantially along line 2—2 of FIG. 1.

The device 10 shown in FIGS. 1 and 2 includes an infeed conveyor 14 that is mounted to a frame 16 at an upwardly sloping incline so the rear end of the infeed conveyor is immediately adjacent to the end of the production conveyor 12. The infeed conveyor 14 receives the tortillas T in a random pattern from the production conveyor 12 and moves the tortillas upwardly toward the forward end of the infeed conveyor. Alignment guides 58 are mounted on the infeed conveyor 14 to align the lateral position of the tortillas T so each tortilla exits the forward end of the infeed conveyor at a predetermined lateral position.

A substantially horizontal transit conveyor 18 is mounted to the frame 16 with the rear end of the transit conveyor immediately adjacent to the forward end of the infeed conveyor 14. The transit conveyor 18 receives the tortillas T at the known lateral position and moves the tortillas forwardly so they pass under optic sensors 22 mounted above the transit conveyor. The optic sensors 22 count and inspect each of the tortillas T as they move toward the forward end of the transit conveyor 18. The transit conveyor 18 discharges the counted and inspected tortillas T onto a curved trajectory guide 24 at the forward end of the transit conveyor. The tortillas T are discharged with sufficient speed to slide over the curved trajectory guide 24. The curved trajectory guide 24 is shaped to bend each of the tortillas T into a curved or arcuate shape and is mounted so as to fling the curved tortillas into the air along a flight trajectory away from the transit conveyor 18 and toward a stacker 20.

As best seen in FIG. 2, a rejection mechanism 26 is mounted to the frame 16 immediately adjacent to the forward end of the transit conveyor 18. If a tortilla T inspected by the sensors 22 is determined to be defective because of, for example, an improper shape, size, or other deformation, the rejection mechanism 26 is activated to direct the rejected tortilla downward onto a reject conveyor 32. The reject conveyor 32 moves rearwardly in a direction opposite the infeed conveyor 14 and the transit conveyor 18, and the rejected tortillas R are delivered to a reject bin 33 shown in phantom under the infeed conveyor.

The stacker 20 is positioned forward of the curved trajectory guide 24, such that the tortillas fly from the trajectory guide and land in the stacker. The tortillas T land in the stacker 20 in a substantially horizontal position and form a stack S of the tortillas. The stacker 20 is adjustable and the size of a stacking area 36 within the stacker can be adjusted so it is slightly larger than the size of the tortilla T being stacked.

A support plate 38 is movably positioned in the stacking area 36 of the stacker 20, so the tortillas T landing in the stacker are supported by the support plate. The support plate 38 moves downwardly toward a receiving plate 44 below the stacker 20 as the tortillas T stack up, such that each of the tortillas T will land in the stacker at approximately the same vertical position. Thus, the flight trajectory of each tortilla T is essentially the same to maintain improved stacking results.

The stacker 20 is connected to a shaker 40 that shakes the stacker and jostles the tortillas T stacked in the stacking area 36. This jostling of the stacked tortillas results in a tight, aligned vertical stack. Thus, if a tortilla T lands in the stacking area 36 and is slightly misaligned relative to the support plate 38 or the other tortillas in the stack, the shaker 40 moves the tortilla back into alignment.

When a predetermined number of tortillas T form a stack S within the stacker 20, the movable support plate 38 moves to a lowered position and the stack is moved out of the stacking area 36 and set onto the receiving plate 44. As discussed in greater detail below, temporary support fingers extend into the stacking area 36 to catch and support the tortillas landing in the stacker 20 when the support plate 38 is moved to the lowered position. Immediately after the tortilla stack S has been set onto the receiving plate 44, a stack remover 46 slidably mounted on the receiving plate moves forwardly and pushes the tortilla stack along the receiving plate to a discharge conveyor 48 adjacent to the forward end of the receiving plate. As soon as the tortilla stack is moved away from the support plate 38, the support plate returns to the raised position and supports the tortillas that had been temporarily supported by the support fingers. This arrangement allows a high volume of inspected and counted tortillas T to be stacked at a very high rate without concern for flying tortillas impacting the stack S as the stack is being moved out of the stacking area 36 and away from the stacker 20.

The discharge conveyor 48 moves the tortilla stack S forwardly and discharges the stack onto an exit ramp 49 that moves the tortilla stack S forwardly to a pickup area 50. Thereafter, the tightly aligned tortilla stack S may be picked up by, for example, a tortilla wrapping device or the like.

Accordingly, tortillas T can be received at the end of the production conveyor at relatively random positions and within a very short period of time be counted, inspected, and stacked with a predetermined number of tortillas in each stack, and then moved to a packaging area or the like.

The components of the device 10 of the preferred embodiment will now be described in greater detail beginning with the infeed conveyor 14 and progressing forward toward the exit ramp 49.

As best seen in FIGS. 1 and 2, the infeed conveyor 14 has an inclined conveyor support 52 with the forward end above the rear end. A rear roller 53 is attached to rear end of the conveyor support 52 and a forward roller 55 is attached to the forward end. A plurality of endless conveyor belts 56 extend around the rear and forward rollers 53 and 55 such that the conveyor belts move above and below the conveyor support 52 and support the tortillas as they are moving along the infeed conveyor. The portions of the conveyor belts 56 above the conveyor support 52 continuously move forward so the tortillas T on the conveyor belts 56 are moved forwardly away from the production conveyor 12. The conveyor belts 56 in the preferred embodiment are round, elastomeric belts that provide sufficient friction between the belts and the tortillas T to prevent the tortillas from slipping substantially. Each of the rollers 53 and 55 have a plurality of grooves 57 formed therein, shown in FIG. 1, that prevent the conveyor belts 56 from drifting along the length of the rollers 53 and 55 during operation of the device, thereby keeping the conveyor belts spaced apart from each other. The grooves 57 also prevent the conveyor belts 56 from drifting along the length of the rollers 53 and 55 during operation of the device.

The forward roller 55 is driven by a drive motor 42 mounted on the frame 16, as shown in FIG. 2. The forward roller 55 drives the conveyor belts 56, which in turn drive the rear roller 53. The drive motor 42 is coupled to the forward roller 55 by an upper drive chain 43 that extends between the forward roller and an intermediate member 41 rotatably attached to the frame 16. A lower drive chain 124 extends between the intermediate member 41 and the drive motor 42. Accordingly, the speed at which the conveyor belts 56 move, and thus the speed at which the tortillas T travel along the infeed conveyor 14, is determined by the speed of the driving motor 42 and the gearing ratio between the drive chains 43 and 124 and the forward roller 55.

The conveyor support 52 is supported in the inclined position by legs 62 that attach at their top ends to the edges of the conveyor support and attach at their bottom ends to the frame 16. The edges of the conveyor support 52 have a plurality of adjustment holes 64 therein that receive a fastener or the like to connect the top ends of the legs 62 to the conveyor support. These adjustment holes 64 allow the degree of incline of the conveyor support 52 to be adjusted by fastening the legs 62 at a selected position between the forward and rearward ends of the conveyor support. The degree of incline increases when the legs 62 are attached at adjustment holes 64 closer to the rearward end of the conveyor support 52, and the incline decreases when the legs are attached closer to the forward end.

The alignment guides 58 are mounted to the conveyor support 52 on opposite sides of the conveyor belts 56, as shown in FIG. 1. A pair of the alignment guides 58 are positioned to have the conveyor belts 56 between them so the alignment guides provide positioning walls on both sides of the conveyor belts 56. The alignment guides 58 are arranged with a large distance therebetween at the rear end of the infeed conveyor 14, and the alignment guides angle inward toward each other as they approach the forward end of the infeed conveyor. At the forward end of the infeed conveyor 14, the distance between alignment guides 58 is slightly larger than the diameter of the tortillas T. The alignment guides 58 are also located at a selected lateral position on the conveyor support 52 so the tortillas T are discharged from the infeed conveyor 14 at a selected lateral position relative to the conveyor support 52 and the transit conveyor 18.

The alignment guides 58 are attached with conventional fasteners to support rods 60 that are secured to the sides of the conveyor support 52. The support rods 60 extend over the width of the conveyor support 52 above the conveyor belts 56. In the preferred embodiment, two generally parallel support rods 60 are attached to the conveyor support 52, and the alignment guides 58 are movably attached to the support rods so the positioning of the alignment guides can be changed to accommodate a selected size and type of tortilla. In the preferred embodiment, the alignment guides 58 for each of the four lanes L are all secured to the same two support rods 60 and positioned so the tortillas T must enter one of the four lanes and move onto the respective conveyor belts 56.

Figure 4:
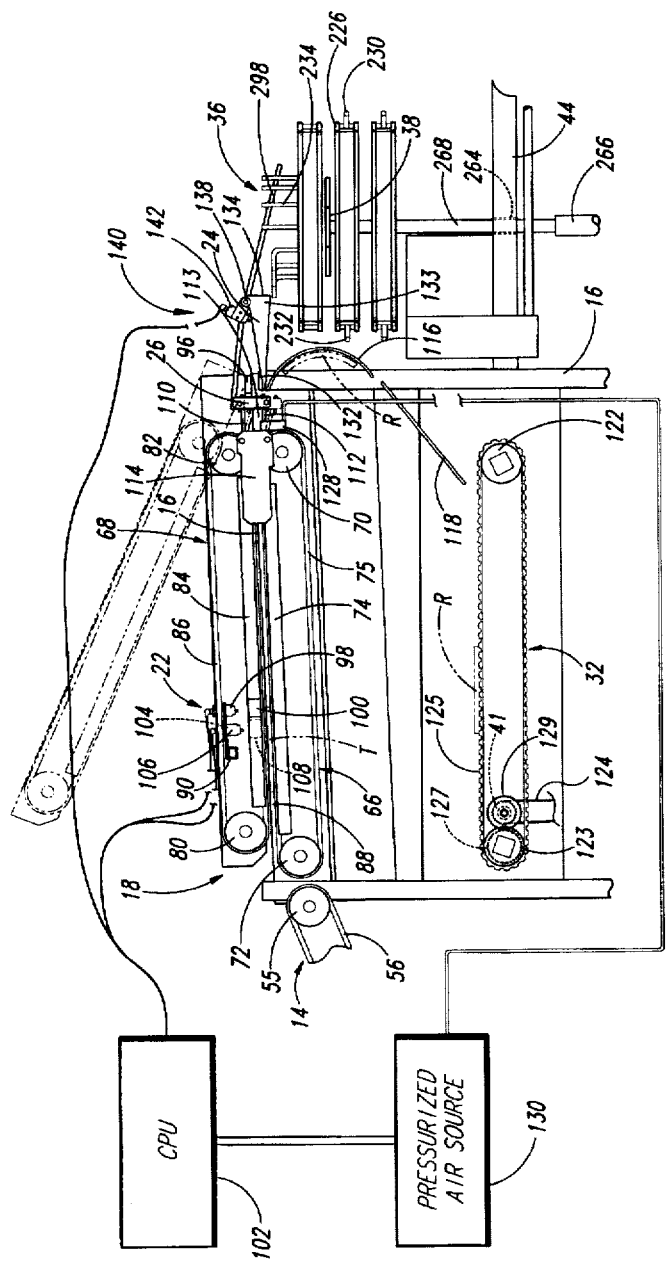
FIG. 4 is an enlarged side elevation view of a portion of the apparatus of FIG. 1 showing a transit conveyor positioned above a reject conveyor, a rejection mechanism forward of the transit conveyor, and a trajectory guide between the transit conveyor and a stacking assembly.

The forward end of the infeed conveyor 14 is positioned at approximately the same vertical height and just rearward of the transit conveyor 18. As best seen in FIGS. 2 and 4, the transit conveyor 18 has a lower conveyor 66 mounted to the top of the frame 16 in a substantially horizontal position, and an upper conveyor 68 mounted over the lower conveyor. The lower conveyor 66 has forward and rear rollers 70 and 72, respectively, at opposite ends of a flat support member 74, and a plurality of endless conveyor belts 75 that extend around the rollers and over the support member.

The support member 74 prevents excess sagging of the conveyor belts 75 under the weight of the tortillas T. The conveyor belts 75 are round, elastomeric belts, similar to the above-described belts 56 of the infeed conveyor. The rollers 70 and 72 each have a plurality of grooves therein that receive the conveyor belts 75 to prevent the belts from drifting along the length of the rollers during operation.

Figure 3:
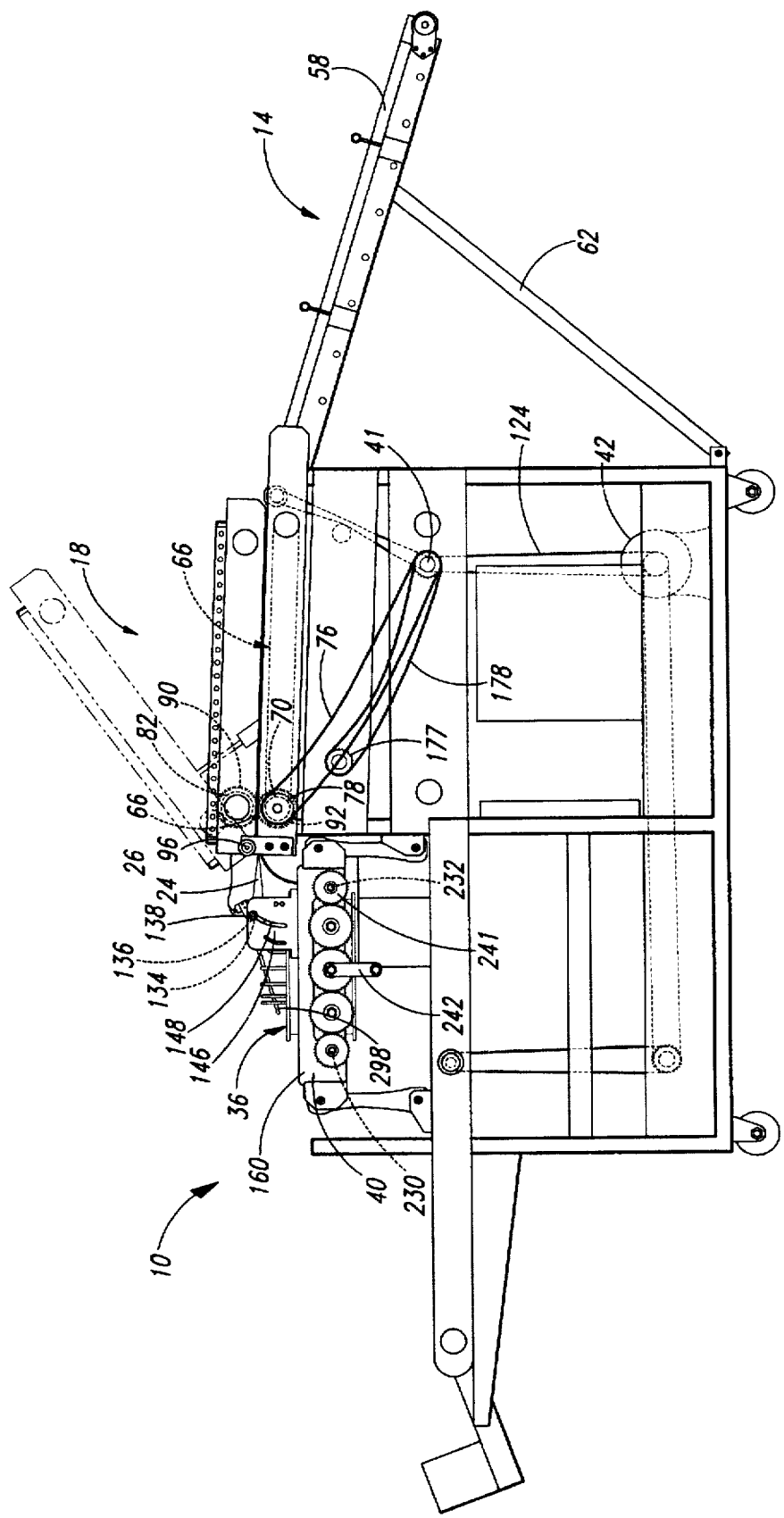
FIG. 3 is a side elevation of the apparatus of FIG. 1 having a side panel removed and an upper transit conveyor shown in phantom in a raised position.

The forward roller 70 of the lower conveyor 66 is driven by a drive chain 76, illustrated in FIG. 3, that engages a gear 78 attached to the forward roller. The drive chain 76 is also connected to the intermediate member 41, which, in turn, is coupled to the drive motor 42. Accordingly, the drive motor 42 drives the lower conveyor 66 so the portions of the conveyor belts 75 above the support member 74 move forwardly, thereby transporting tortillas T toward the stacker 20.

The relative speed of the lower conveyor 66 is slightly greater than the speed of the infeed conveyor 14. This higher speed of the transit conveyor 18 helps maintain sufficient space between tortillas T on the transit conveyor, and also helps separate tortillas that may be overlapping each other as they are delivered to the transit conveyor from the infeed conveyor 14.

The upper conveyor 68 shown in FIG. 4 is similar to the lower conveyor 66 with rear and forward rollers 80 and 82, respectively, attached to opposite ends of a support member 84. A plurality of endless, elastomeric conveyor belts 86 extend between the rollers 80 and 82 and around the support member 84. The portions of conveyor belts 86 below the support member 84 are located above the conveyor belts 75 of the lower conveyor 66 so as to form a gap 88 therebetween. The gap 88 is sized so a tortilla T moves through the gap with the upper conveyor belts 86 contacting the top of the tortilla and the lower conveyor belts 75 contacting the bottom of the tortilla T. The upper and lower conveyor belts 86 and 75 minimize slippage of the tortillas on the transit conveyor 18, while keeping the tortillas T flat and in the predetermined lateral position. The conveyor belts 86 of the upper conveyor 68 are driven by the forward roller 82 so the portions of the conveyor belts below the support member 84 move forward at the same speed as the conveyor belts 75 of the lower conveyor 66. As best seen in FIG. 3, the forward roller 82 has a gear 90 mounted therein that meshes with a similar gear 92 mounted on the forward roller 70 of the lower conveyor. Accordingly, the upper conveyor 68 is driven by the lower conveyor 66 which, in turn, is driven by the drive motor 42. The gears 90 and 92 are the same size so the conveyor belts 75 and 86 of the lower and upper conveyors 66 and 68 move at the same speed.

The upper conveyor 68 is pivotally connected to a bracket 96 secured to the forward end of the lower conveyor 66, such that the upper conveyor 68 is movable between a lowered operating position, shown in solid lines in FIG. 3 and 4, and a raised open position shown in phantom lines. If, for example, a jam ever occurs in the transit conveyor 18 between the lower and upper conveyors 66 and 68, the upper conveyor 68 can be pivoted upward to the raised open position to gain access to the area between the upper and lower conveyors to clear the jam. In the preferred embodiment a safety mechanism, such as a kill switch or the like (not shown), is provided between the lower and upper conveyors 66 and 68 to stop the lower and upper conveyors and the infeed conveyor whenever the upper conveyor is moved toward the raised open position. This safety mechanism helps prevent injuries to workers that are, for example, clearing a jam, cleaning the transit conveyor 18, or performing standard maintenance.

Figure 8:
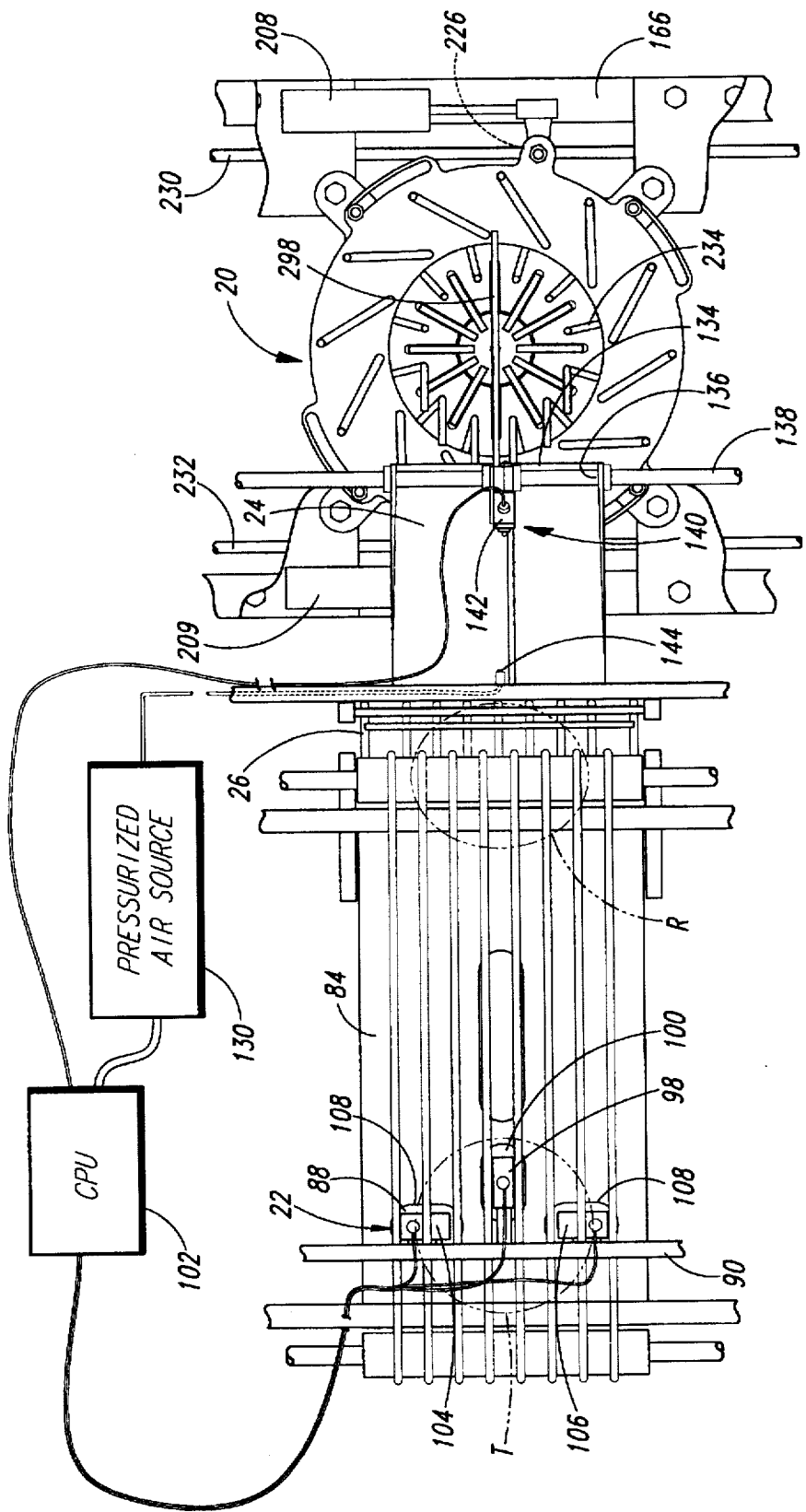
FIG. 8 is an enlarged top plan view of a portion of the apparatus of FIG. 1 showing sensors above the transit conveyor and showing an anti-jam apparatus above the trajectory guide of FIG. 1.

As best seen in FIGS. 4 and 8, the sensors 22 are mounted on a support 90 on the upper conveyor 68 and the sensors are directed downward toward the gap 88. The sensors 22 include a center sensor 98 that is positioned generally along the centerline of the lower conveyor 66, which corresponds to a centerline of the path taken by the tortilla T as it moves along the transit conveyor 18. The center sensor 98 is aimed through a hole 100 in the support member 84 of the upper conveyor 68 to detect tortillas passing through the gap 88 in the transit conveyor.

The center sensor 98 is electrically connected to a central processing unit (CPU), shown schematically at 102. The center sensor 98 is configured to send a signal to the CPU 102 each time the center sensor 98 detects a tortilla T passing under the hole 100, and the CPU keeps track of the number of tortillas passing under the center sensor 98. Accordingly, the center sensor 98 is configured to count the tortillas as they pass through the transit conveyor 18.

The center sensor 98 is also configured to inspect each of the tortillas T to determine whether the length of the tortilla is acceptable. If the length of the tortilla T is within a predetermined range, for example between 5½ inches and 5¾ inches, the center sensor 98 generates a signal and sends it to the CPU 102 indicating that the tortilla has an acceptable length in accordance with set quantity standards. If the center sensor 98 detects that the tortilla T has a length outside of the predetermined range, a signal is sent to the CPU 102 indicating that the tortilla is a reject tortilla R. As discussed in greater detail below, the rejection mechanism 26 is activated when a reject tortilla R is detected, and the rejection mechanism removes the rejected product before it reaches the trajectory guide 24 or the stacker 20.

Left and right sensors 104 and 106 are mounted to the support 90 on opposite sides of the center sensor 98. The left and right sensors 104 and 106 are aimed toward the gap 88 through holes 108 in the support member 84. The left and right sensors 104 and 106 are also electrically connected to the CPU 102 and are configured to inspect the width of each tortilla T to determine whether the width of the tortilla is within a predetermined range of widths, such as between 5½ and 5¾ inches in diameter. If the width of the tortilla T is within a predetermined range, then the left and right sensors 104 and 106 generate a signal and send it to the CPU 102 indicating that the tortilla has an acceptable width. If the tortilla T is not within this predetermined range of acceptable widths, the left or right sensor 104 or 106 sends a signal to the CPU 102 indicating a reject tortilla R. Thereafter, the rejection mechanism 26 will be activated to remove the reject tortilla R before it reaches the trajectory guide 24 or the stacker 20.

In the preferred embodiment, the center sensor 98 and the left and right sensors 104 and 106, respectively, are optic sensors that detect changes in light. Other types of sensors, however, could be used to inspect the tortillas or other generally planar articles. The arrangement of the sensors can also be adjusted so as to control the acceptable range of lengths and/or widths of a tortilla T or other generally planar article.

As indicated above, the reject tortillas R detected by the sensors 98, 104, and 106 are removed by the rejection mechanism 26. As best seen in FIG. 4, the reject mechanism 26 is attached to the transit conveyor 18 forward of the discharge ends of the lower and upper conveyors 66 and 68. The rejection mechanism 26 has a top plate 110 and a bottom plate 112 and a gap 113 therebetween that is slightly larger than the gap 88 between the upper and lower conveyors 68 and 66. The top and bottom plates 110 and 112 are connected together as a unit. Accordingly, the tortilla T must pass through the rejection mechanism 26 as they are discharged from the transit conveyor 18.

The top plate 110 of the rejection mechanism 26 is pivotally connected to a bracket 114 mounted on the transit conveyor 18, so the top and bottom plates 110 and 112 can be pivoted between a raised position, shown in solid lines in FIG. 4, and a lowered position, shown in phantom. In the raised position, the rejection mechanism 26 directs the tortillas T forward onto the trajectory guide 24. In the lowered position, the forward end of the top and bottom plates 110 and 112 are rearwardly adjacent to a curved deflector 116 mounted just below the rearward end of the trajectory guide 24. The rejection mechanism 26 is moved to the lowered position when a reject tortilla R is detected by one or more of the sensors, and the reject tortilla R is directed downward away from the trajectory guide 24 onto the curved deflector 116.

A pneumatic actuator 128 is connected to the reject mechanism 26 to move the top and bottom plates 110 and 112 between the raised and lowered positions. The pneumatic actuator 128 is connected to a pressurized air source, shown schematically at 130 in FIG. 4, by a conventional air hose, and the pressurized air source is coupled to the CPU 102. The CPU 102 controls the pneumatic actuator 128, and thus, the CPU controls the position of the reject mechanism 26.

The curved deflector 116 is shaped to direct a reject tortilla R downward and rearward onto a rearwardly inclined slide 118 mounted to the frame 16. The slide 118, in turn, guides the reject tortilla R downward and rearward onto the reject conveyor 32. In the preferred embodiment, the curved deflector 116 and the slide 118 are metal sheets that allow the reject tortillas to freely slide onto the reject conveyor 32.

The reject conveyor 32 is a generally horizontal conveyor assembly mounted to the frame 16 and positioned below the transit conveyor 18. The reject conveyor 32 has forward and rear rollers 122 and 123, and a continuous belt 125 extending around the rollers. The rear roller 123 has a gear 127 mounted thereon that engages a gear 129 on the intermediate member 41, which is driven by the drive motor 42. This connection of the gears 127 and 129 causes the reject conveyor 32 to move reject tortillas R rearward and in a direction opposite the tortillas T moving along the transit conveyor 18. The reject conveyor 32 deposits the reject tortillas R in the reject bin.

When the reject mechanism 26 is in the lowered position and the sensors 98, 104, and 106 detect an acceptable tortilla T, the CPU 102 activates the actuator 128 and the reject mechanism is pivoted to the raised position so the acceptable tortilla is directed forward onto the curved trajectory guide 24.

Figure 5:
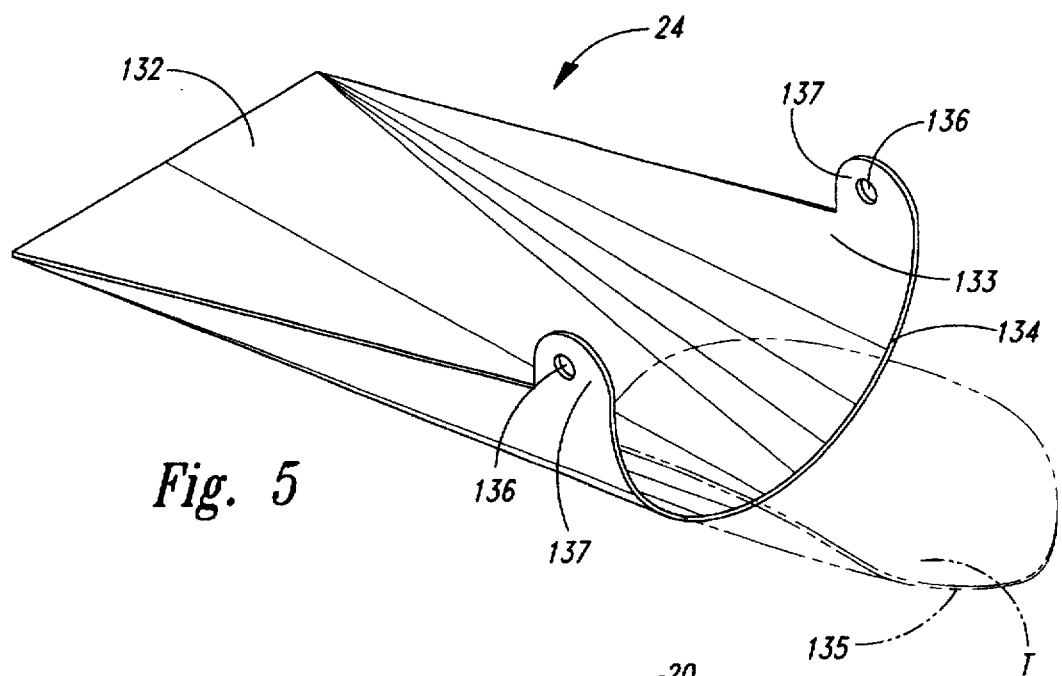
FIG. 5 is an enlarged isometric view of the trajectory guide of FIG. 4.

The curved trajectory guide 24 shown in FIG. 4 has a rear receiving end 132 that is positioned forwardly adjacent to the rejection mechanism 26, and a forward end 133 with a leading edge 134 that is positioned above a rear portion of the stacker 20. As best seen in FIG. 5, the rear receiving end 132 is generally flat to receive the tortilla T without blocking or otherwise interrupting movement of the tortilla. The sides of the trajectory guide 24 are curved upward to a greater and greater degree as they extend toward the leading edge 134, such that the leading edge has an arcuate shape. The curved trajectory guide 24 is shaped to bend the sides of the tortilla T, shown in phantom, upward so the tortilla has an arcuate shape when it slides off of the leading edge 134 of the trajectory guide and is launched into a flight trajectory away from the trajectory guide. The trajectory guide 24 of the preferred embodiment is a curved metal sheet that allows the tortillas to slide freely over the guide. Although a metal sheet is used in the preferred embodiment, other materials, such as plastic or the like, can be used. In addition, the shape of the trajectory guide 24 can be varied to increase or decrease the severity of the arcuate shape as needed to accommodate different flexible planar articles.

The arcuate shape of the tortilla T is such that the leading edge 135 of the tortilla will resist bending upward or downward when the tortilla flies from the trajectory guide 24 into its flight trajectory. Thus, the arcuate shape allows the tortilla T to maintain its shape and remain generally horizontal throughout the flight trajectory. Without the arcuate shape, the tortilla T has a tendency to buckle or bend at the leading edge 135 and land on a stack in a folded position.

Each of the upper sides of the trajectory guide 24 just rearward of the leading edge 134 has an ear portion 137 with a mounting hole 136 in the ear portion. As best seen in FIGS. 2 and 8, the trajectory guide 24 is connected to a mounting rod 138 that extends through the mounting holes 136 and positions the trajectory guide at a predetermined distance above and rearward of the stacker 20. The mounting rod 138 is generally transverse to the tortillas' direction of travel and the mounting rod attaches at its ends to the frame 16. The trajectory guide 24 of the preferred embodiment is securely attached to the mounting rod 138 in a cantilevered position so the flat receiving end 132 is slightly below the forward end of the rejection mechanism 26. In an alternate embodiment, the flat receiving end of the trajectory guide 24 is supported from below by one or more support members attached to the frame 16.

The mounting rod 138 is attached at each end to a mounting block 146 having a rearwardly curving slot 148 therein, as best seen in FIG. 3, that receives an end of the mounting rod 138. The slots 148 allow for vertical adjustment of the mounting rod 138, and thus the leading edge 134 of the trajectory guide 24, relative to the stacker 20. Accordingly, the flight trajectory of a tortilla T can be controlled by adjusting the vertical position of the mounting rod 138 within in the slots 148. The higher the mounting rod 138, the greater the arc of the tortilla's flight trajectory.

As best shown in FIG. 4, an overshoot guide 298 is attached to the mounting rod 138 above the trajectory guide 24 and extends forward and downward over the stacking area 36 of the stacker 20. The overshoot guide 298 is positioned to block a tortilla from overshooting the stacker 20 and to direct the tortilla downward into the stacker.

The mounting blocks 146 are mounted to the top of the shaker 40 that shakes the stacking apparatus 20. When the shaker 40 moves back and forth, as discussed in greater detail below, the mounting blocks, the mounting rod 138 and the trajectory guide 24 move back and forth with the shaker. This movement of the trajectory guide 24 requires that the flat receiving end 132 of the trajectory guide be moveable, e.g., cantilevered, slideably supported, or the like, relative to the frame 16.

In the preferred configuration of the transit conveyor 18, the rejection mechanism 26 and the curved trajectory guide 24 is such that the transit conveyor discharges each tortilla T with enough velocity to slide the tortilla through the rejection mechanism, across the trajectory guide, and into a flight trajectory toward the stacker 20. The beginning of the flight trajectory of each tortilla is generally the same, and the end of the flight trajectory is determined by the location of a landing area for the tortilla. If, however, a tortilla T is blocked or otherwise does not slide off of the trajectory guide 24 fast enough, a group of tortillas could pile up on the trajectory guide, and cause a jam.

As best seen in FIGS. 4 and 8, an anti-jam system 140 is provided above the trajectory guide 24 to clear any jams that may occur. The anti-jam system 140 includes a jam sensor 142 that is securely connected to the mounting rod 138 above the trajectory guide 24. The jam sensor 142 is directed toward the approximate centerline of the trajectory guide 24 along which the tortillas T travel. The jam sensor 142 detects when a tortilla T remains on the trajectory guide 24 too long, thereby indicating a jam has occurred. The jam sensor 142 of the preferred embodiment is an optic sensor similar to the sensors 98, 104, or 106 discussed above.

The jam sensor 142 is coupled to the CPU 102 and generates a signal to the CPU when a jam is detected. An air nozzle 144 rearward of the jam sensor 142 is attached to a cross-member of the frame 16 and aimed at the approximate centerline of the trajectory guide 24. The air nozzle 144, as best seen in FIG. 8, is connected to an air hose, which is connected to the pressurized air source 130. When the jam sensor 142 detects a jam, the signal is sent to the CPU 102, and the CPU activates the pressurized air source 130.

Pressurized air is forced through the air nozzle 144, and a blast of air is directed forward onto the trajectory guide 24. The blast of air blows the jammed tortillas off of the trajectory guide 24 and into the stacker 20, thereby clearing the jam from the trajectory guide. The tortillas blown into the stacker 20 are then lowered out of the stacker 20, onto the receiving plate 44 and pushed forward onto the discharge conveyor, as discussed in greater detail below.

When the jam sensor 142 detects a jam, the CPU 102 simultaneously activates the pneumatic actuator 128 connected to the rejection mechanism, shown in FIG. 4, and the rejection mechanism 26 is pivoted to the lowered position. Accordingly, all of the tortillas T moving through the transit conveyor 18 behind the jam are directed downward onto the reject conveyor 32 until the jam is cleared from the trajectory guide 24. As soon as the jam sensor 142 indicates the jam has been cleared, the rejection mechanism 26 returns to the raised position and tortillas T are again passed over the trajectory guide 24 and launched toward the stacker 20.

As best seen in FIGS. 1 and 2, the shaker 40 is movably mounted on the frame 16 and is positioned above the receiving plate 44 under the stacker 20. The shaker 40 has a shaker frame 166 that surrounds and securely attaches to the stacker 20. The shaker frame 166 is supported on the top of four vertically oriented legs 152; a forward leg and a rear leg on each of the left and right sides of the shaker frame.

The left and right sides of the shaker frame 166 are formed by side plates 160 that extend between the forward and rearward legs 152. Each of the front and back sides of the shaker frame 166 are formed by two support rods 168 that extend between the side plates 160 generally transverse to the direction of travel of the tortillas T. Upper brackets 158 are attached to the front and back sides of the side plates 160, and the top portions of the legs 152 are secured to the upper brackets. A rubber insert is mounted in an aperture at the top of each leg 152 and the respective upper bracket 158 is secured to the rubber insert. The rubber inserts protect the legs 152 and the upper brackets from excessive wear when the shaker 40 operates.

As best seen in FIG. 2, a horizontal shaker rod 172 is connected at its front end to the rear side of the shaker frame 166 adjacent to one of the rear legs 152. The preferred embodiment uses two shaker rods 172 securely connected at their front and the left and right sides of the shaker frame 166. The rear end of each shaker rod 172 is attached to an eccentric bearing 174 mounted on the end of a drive shaft 176. The drive shaft 176 is supported by flame-mounted brackets below the transit conveyor 18 and above the reject conveyor 32. A drive gear 177, shown in FIG. 3, is connected to one end of the drive shaft 176, and the drive gear is coupled to the drive motor 42 by a drive chain 178.

In the preferred embodiment, the drive chain 178, shown in FIG. 3, extends from the drive gear 177 to the intermediate member 41, which is connected to the drive chain 124. Accordingly, the drive motor 42 moves the drive chains 124 and 178, which, in turn, rotate the drive shaft 176. The eccentric bearing 174 converts the rotational movement of the drive shaft 176 into reciprocating horizontal motion of the shaker rod 172. The preferred eccentric bearings 174 cause the shaker rods 172 to quickly move back and forth through a fixed range of motion thereby shaking the shaker frame 166 and the stacker 20 mounted to the shaker frame.

The stacker 20 is positioned below the leading edge 134 of the trajectory guide 24 and the center of the stacker is forward of the trajectory guide, such that the tortillas T will fly along the flight trajectory from the trajectory guide and land in the stacker to form the aligned stack of tortillas. The stacker 20 illustrated in FIGS. 6 and 7 includes a housing 180 having the stacking area 36 disposed therein that is shaped and sized to correspond to the shape and size of the tortillas T being stacked, shown in phantom in FIG. 7. The housing 180 includes three sets of coaxially aligned plates;

a top set 184, a center set 188, and a bottom set 192. Each of the three sets of plates, 184, 188, and 192 have a central, generally circular, opening therein, 186, 190 and 194, respectively, with the circular central openings being coaxially aligned. The central openings 186, 190, and 194 form the stacking area 36 that receives tortillas at the end of their flight trajectory. Although the preferred embodiment utilizes a cylindrical stacking area 36 within the housing 180 to receive the tortillas or other flexible generally planar food articles, housings with other shaped stacking areas can be used.

Figure 6:
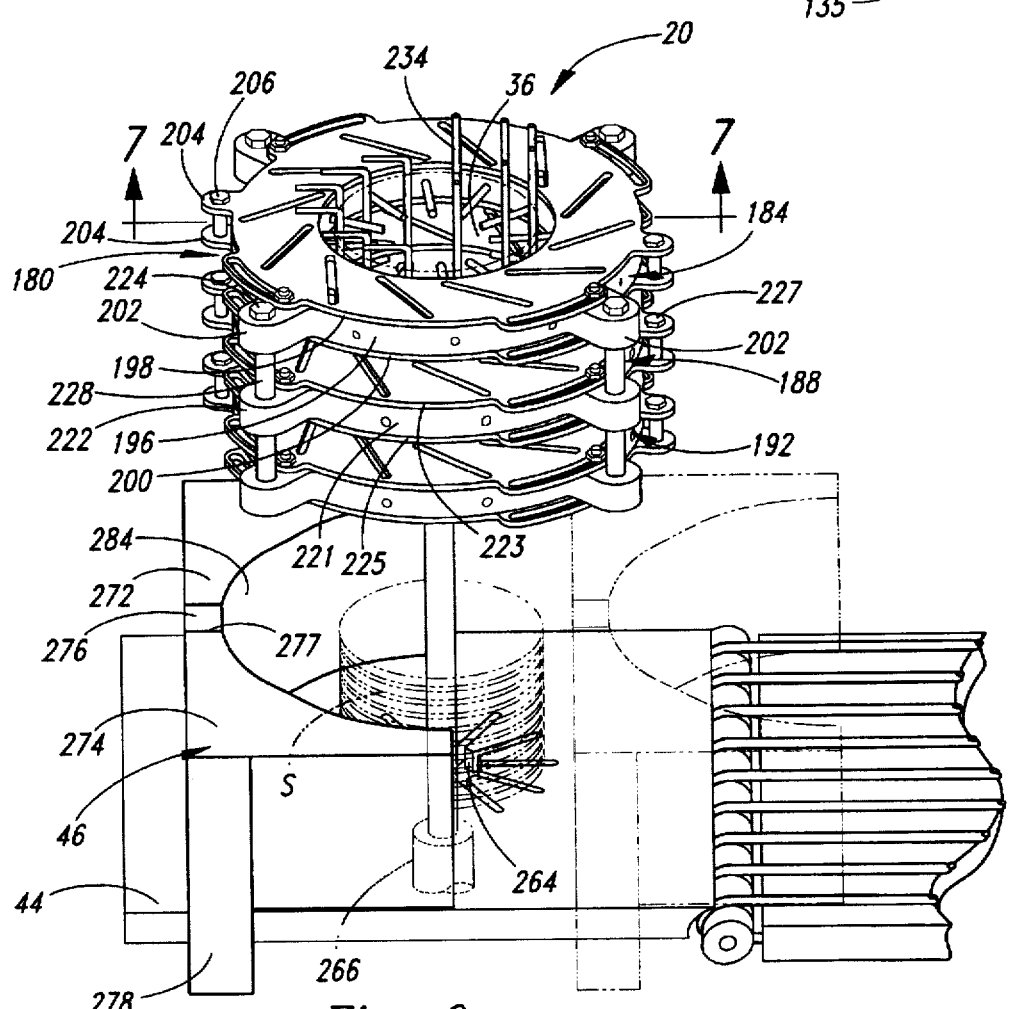
FIG. 6 is an enlarged isometric view of the stacking assembly shown in FIG. 4 above a base plate and a stack removing device.
Figure 7:
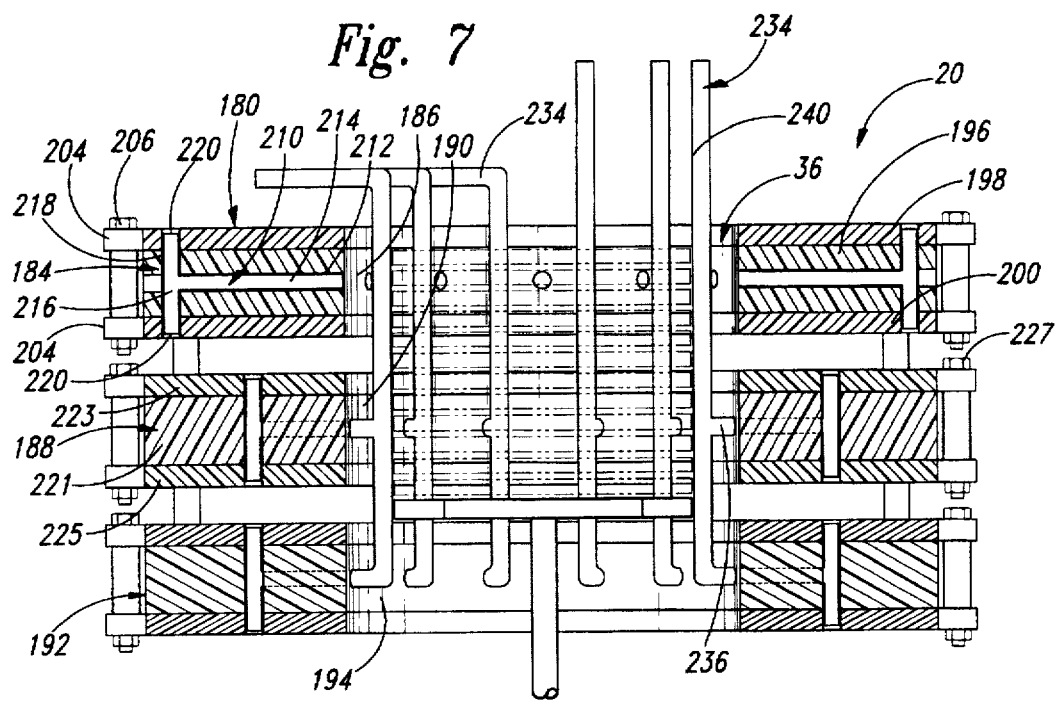
FIG. 7 is a cross-sectional view taken substantially along line 7—7 of FIG. 6.
Figure 9:
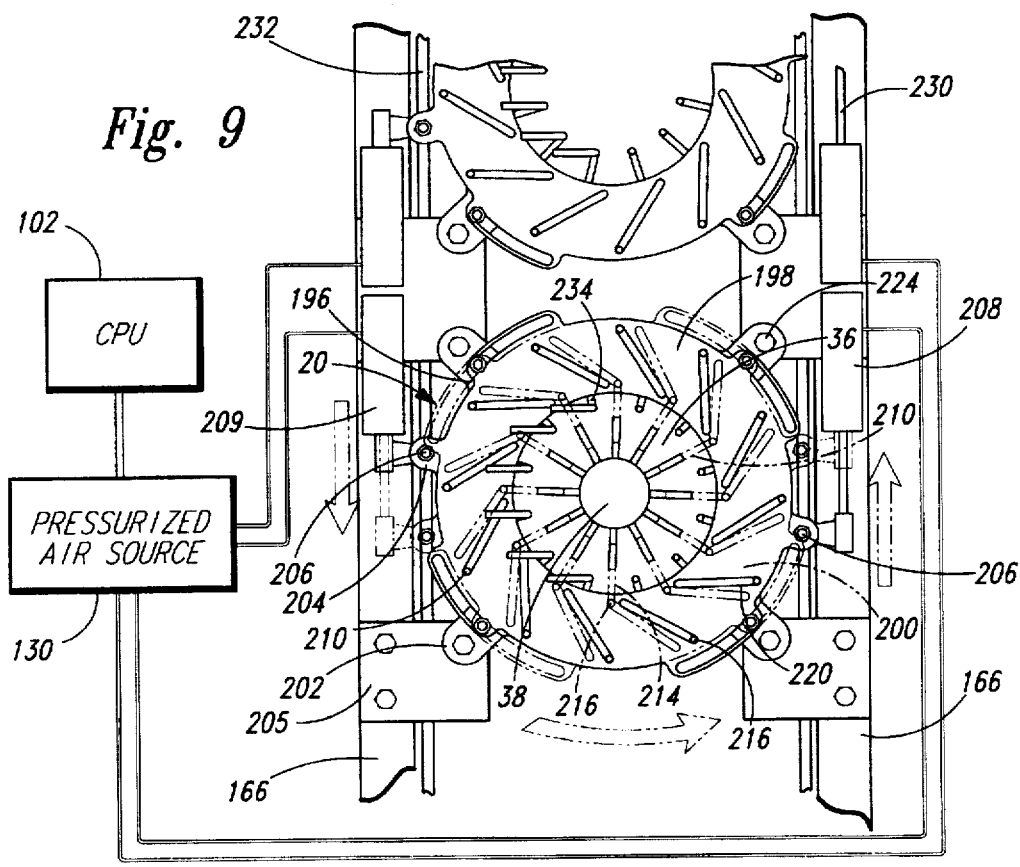
FIG. 9 is an enlarged plan view of a stacking assembly of FIG. 1 mounted to a shaker, with the stacking assembly shown in solid in a first position, and shown in phantom in a second, rotated position.

The top set of plates 184 has three interconnected plates arranged in a stack. As best seen in FIGS. 6 and 7, movable upper and lower plates 198 and 200 are similarly shaped, and are connected to each other and positioned to sandwich a stationary centerplate 196 therebetween. Each of the upper and lower plates 198 and 200 have ears 204 that receive fasteners 206 to secure the plates together above and below the centerplate. The ears 204 of the upper and lower plates 198 and 200 are offset from ears 202 on the centerplate 196 to avoid interference between the plate. As best seen in FIG. 9, the ears 202 on the centerplate 196 are securely fastened to brackets 205 mounted to the shaker frame 166 to secure the centerplate in a stationary position relative to the shaker frame 166 and the upper and lower plates 198 and 200.

Two of the fasteners 206 extending through the ears 204 on the upper and lower plates 198 and 200 are connected to front and rear pneumatic actuators 208 and 209, respectively. The front actuator 208 is mounted on the front side of the shaker frame 166 and the rear actuator 209 is mounted on the rear side of the shaker frame. The front and rear actuators 208 and 209 are positioned to move in opposite directions to rotate the upper and lower plates 198 and 200 together as a unit about the longitudinal axis of the stacking area 36. For example, when the front and rear actuators 208 and 209 are activated, the front actuator 208 pushes or pulls on the upper and lower plates 198 and 200 in one direction and the rear actuator 209 pulls or pushes the plates in the opposite direction, thereby rotating the upper and lower plates 198, 200 about the longitudinal axis of the stacking area 36.

This rotational movement of the upper and lower plates 198 and 200 causes a plurality of interrupt fingers 210, which are connected to the upper and lower plates, to move between and extended position shown in phantom in FIG. 9, and a retracted position, shown in solid. When the interrupt fingers 210 are in the extended position and a portion of the interrupt fingers extend into the stacking area 36 to temporarily support tortillas therein in the retracted position as discussed below, the interrupt fingers 210 are clear of the stacking area 36 and do not interfere with the tortillas.

As best seen in FIG. 7, each of the interrupt fingers 210 is a T-shaped rod having a horizontal leg 214 that is slidably disposed in a horizontal hole 212 extending horizontally through the centerplate 196. A vertical leg 216 of the interrupt finger 210 connects to the outer ends of the horizontal leg 214, and extend vertically in opposite directions through vertical holes 218 in the centerplate. The top and bottom ends of the vertical leg 216 extend into slots 220 formed in the upper and lower plates 198 and 200, respectively. The slots 220 in the upper and lower plates 198 and 200 are oriented so they are radially angled relative to the central opening 186. When the front and rear actuators 208 and 209 are activated, the upper and lower plates 198 and 200 are rotated and the slots 220 are moved relative to the stationary centerplate 196, as shown in FIG. 9. This movement of the slots 220 pushes on the vertical legs 216 of the interrupt fingers 210, so the vertical legs slide along the length of the slots, and the horizontal legs 214 are pushed radially inward to the extended position or radially outward to the retracted position.

The front and rear actuators 208 and 209 discussed above are coupled to the pressurized air source, which is controlled by the CPU 102. Thus, the movement of the interrupt fingers 210 and the timing of such movement, e.g., between the extended and retracted positions, is controlled and coordinated with the movement of other components by the CPU 102.

The center and bottom sets of plates 188 and 192 are substantially the same, and only the center set of plates will be described, with the description being applicable to the bottom set of plates. As best seen in FIG. 6, the center set of plates 188 has three interconnected plates arranged in a stack, with a stationary middle centerplate 221 sandwiched between upper and lower movable plates 223 and 225, respectively. The middle centerplate 221 has ears 222 that are positioned below the ears 202 of the top centerplate 196, and the middle centerplate is secured in position with an elongated fastener 224 that extends through both sets of ears 202 and 222. In the preferred embodiment, the fastener 224 extends through the aligned ears of all three centerplates, so all of the centerplates are secured to the frame 16. Spacers 228 are provided on the fastener 224 to maintain a desired distance between the centerplates.

The upper and lower plates 223 and 225 of the center set of plates 188 are essentially the same as the upper and lower plates 198 and 200 of the top set of plates 184. The upper and lower plates 223 and 225 are secured together with fasteners 227 that extend through aligned ears 226. A plurality of sizing rods 234 shown in FIGS. 6 and 7 are attached to the upper and lower plates 223 and 225 around the perimeter of the stacking area 36, and the rotational movement of the upper and lower plates 223 and 225 causes the sizing rods to be moved radially inward or outward so as to change the relative size of the central openings. Each of the sizing rods 234 has a vertical shaft 240 connected to a T-shaped leg 236 and the T-shaped leg extends radially outwardly from the shaft and engages the centerplates 221 and the upper and lower plates 223 and 225 in the same manner the T-shaped interrupt fingers 210 engage the top set of plates 184, discussed above. In the preferred embodiment, a T-shaped leg is also connected to the bottom set of plates 192 in the same manner. Thus, each sizing rod 234 has two T-shaped legs connected to the vertical shaft 240. Accordingly, the sizing rods 234 can be moved in or out to increase or decrease the size of the stacking area 36 by rotating the upper and lower plates 223 and 225 about the longitudinal axis of the stacking area 36, thereby pushing the T-shaped legs 236 along the slots in the upper and lower plates and moving the T-shaped legs and the vertical shaft 240 radially inward or outward.

The upper and lower plates 223 and 225 are connected to forward and rear adjusting rods 230 and 232 that move in opposite directions to rotate the upper and lower plates. As best seen in FIGS. 4 and 8, one of the fasteners 227 extending through the ears 226 in the upper and lower plates attaches to the forward adjusting rod 230 that extends between the left and right sides of the shaker frame. A second of the fasteners 227 attaches to the rear adjusting rod 232 that also extends between the left and right sides of the shaker frame. These two adjusting rods 230 and 232 can be simultaneously moved in opposite directions in order to cause the upper and lower plates 223 and 225 to rotate about the longitudinal axis of the central opening 190. This rotational movement is translated into radial movement of the sizing rods 234.

In the preferred embodiment, each of the adjusting rods 230 and 232 have a worm screw at one end, and the worm screws are connected to a plurality of gears 241 mounted to one side of the side plates 160 of the shaker frame 166, shown in FIG. 3. A handle 242 is attached to the gears 241 and is used to rotate the gears such that the worm screw is engaged and the adjustable rods 230 and 232 are moved in opposite directions thereby moving the sizing rods 234 inwardly or outwardly to adjust the stacking areas within the housing 180. In the preferred embodiment, the sizing rods are adjusted so the stacking area is slightly larger than the tortillas T being stacked. This arrangement allows the tortillas T to be stacked within the housing as the shaker shakes the stacker and jostles the stack of tortillas to obtain a tight, aligned stack before the stack is removed from the stacker 20.

The stacker 20 is positioned above the receiving plate 44. As best seen in FIGS. 2, 4, and 6, the receiving plate 44 is positioned above an actuator 266. The actuator 266 is connected to a vertical shaft 268 that supports and moves the support plate 38 relative to the stacker. The shaft 268 extends upward from the actuator 266, through an aperture 264 in the receiving plate 44, and connected to the support plate 38. The actuator 266 moves the vertical shaft 268 and the support plate 38 between a raised position with the support plate near the top of the stacker 20, and a lowered position with the support plate at the receiving plate.

In the preferred embodiment, the aperture 264 in the receiving plate 260 has the same shape but is slightly larger than the support plate 38. When the support plate 38 is moved to the lowered position, the support plate 38 is received within the aperture 264. The aperture 264, however, is shaped so the tortilla stack S on the support plate, as illustrated in FIG. 6 in phantom, will be set onto the receiving plate 44 when the support plate is moved into the aperture 264. In this position, the stack S can be moved off of the support plate 44 by the stack remover 46 without interference from the support plate 38.

The actuator 266, is also connected to the pressurized air source and thus is controlled by the CPU 102. The actuator 266 moves the support plate 38 from the raised position toward the lowered position in incremental steps as the tortillas T are being stacked within the stacker 20. The size of the incremental steps can be controlled by programming the CPU to increase or decrease movement of the shaft 268. In the preferred embodiment, the support plate 38 moves in incremental steps such that each tortilla T flying from the trajectory guide 24 will land within the stack at approximately the same vertical position below the trajectory guide. As the stack of tortillas grows, the actuator 266 moves the support plate 38 incrementally downwardly so each tortilla landing in the stacker will have approximately the same flight trajectory.

As best seen in FIG. 2, a plurality of sensors 270 are coupled to the actuator 266 to detect the position of the shaft 268, and thus the vertical position of the support plate 38. The plurality of sensors 270 include a top sensor that determines whether the support plate 38 is in the raised position, a bottom sensor that determines whether the support plate is in the lowered position, and first, second and third intermediate sensors that determine whether the support plate is in first, second, or third intermediate positions, respectively, between the raised and lowered positions. The first intermediate position is closest to the raised position, and the third intermediate position is closest to the lowered position. The sensors 270 are electrically coupled to the CPU 102, and if one or more of the sensors does not detect the vertical shaft 268 at an expected position, the sensor 270 generate a signal indicating a malfunction in the unit. The CPU 102 then activates the rejection mechanism 26 so the tortillas T are diverted onto the reject conveyor 32 until the malfunction is corrected.

Although the preferred embodiment is configured so the actuator 266 moves the support plate 38 downwardly in incremental steps, the CPU 102 can be programmed so the actuator 266 moves the support plate 38 downwardly in a smooth continuous motion at a predetermined rate that results in each tortilla T having the same flight trajectory.

After a predetermined number of tortillas T have been stacked on the support plate 38, the CPU 102 activates the actuators 208 and 209 connected to the stacker and the interrupt fingers 210 are moved from the retracted position to the extended position. In this position the interrupt fingers catch and temporarily support the tortillas T landing in the stacker 20, as shown in FIG. 6. As the interrupt fingers 210 are moved to the extended position, the support plate 38 is moved to the lowered position and the stack S of tortillas is set onto the top surface of the receiving plate 44.

The stack S is pushed forward along the receiving plate 44 by the stack remover 46 to a discharge position and the support plate 38 is returned to the raised position. The stack remover 46 shown in FIG. 6 has left and right transfer cups 272 and 274 that are positioned on opposite sides of the receiving plate 44. The left and right transfer cups 272 and 274 each have a quarter cylindrical shape with the inner edges 277 positioned apart from each other. Thus, the left and right transfer cups 272 and 274 together form a substantially semi-cylindrical structure with a gap 276 between the inner edges 277. The transfer cups 272 and 274 slide along the receiving plate 44 between a withdrawn position shown in solid lines in FIG. 6, and a discharge position, shown in phantom. In the withdrawn position, the transfer cups 272 and 274 are at the rearward edge of the receiving plate 44, rearward of the aperture 264, and in the discharge position the transfer cups are at the forward edge of the receiving plate and forward of the aperture. When the transfer cups 272 and 274 move to the discharge position, the stack S of tortillas on the receiving plate 260 is pushed forward to a discharge position.

In the preferred embodiment, each of the left and right transfer cups 272 and 274 has a curved face 284 that is shaped to engage and support the tortilla stack S as the stack is being slid to the discharged position. The curved face 284 has a plurality of different radii, so the same transfer cups 272 and 274 will effectively support stacks of tortillas or other generally planar articles having a variety of different sizes or shapes.

Each of the left and right transfer cups 272 and 274 has a side plate 278 that extends downward below the edge of the receiving plate 44. The side plates 278 are connected to a shaft 280 of a pneumatic actuator 282, shown in FIG. 2 mounted to the frame 16 under the receiving plate 44. The actuator 282 is connected to the pressurized air source and controls the position of the transfer cups 272 and 274. In the preferred embodiment, the actuator 282 pulls the transfer cups 272 and 274 and the stack S of tortillas to the discharge position. Thereafter, the support plate 38 is raised from the lowered position to the raised position, so the shaft 268 connected to the support plate extends upwardly through the aperture 264. With the support plate 38 in the raised position, the actuator 282 pushes the transfer cups 272 and 274 rearwardly to the withdrawn position, with gap 276 allowing the transfer cups to slide past the extended shaft 268. Thus, there is no interference between the shaft 268 and the transfer cups 272 and 274.

During this sequence of movement by the support plate 38 and the transfer cups 272 and 274, a predetermined number of tortillas, e.g., from two to six, are temporarily supported by the interrupt fingers in the stacker 20. After the support plate 38 is returned to the raised position, the interrupt fingers are retracted, the tortillas T are then supported by the support plate.

As best seen in FIG. 2, the discharge conveyor 48 is positioned just forward of the receiving plate 44 with the rear end of the discharge conveyor corresponding to the discharged position of the tortilla stack S. The discharge conveyor 48 includes rear and forward rollers 286 and 288 mounted to the frame 16 and a support plate 290 mounted to the frame intermediate the rear and forward rollers. A plurality of conveyor belts 292 extend around the rear and forward rollers 286 and 288 and over the support plate 290. In the preferred embodiment, the conveyor belts 292 are similar to the endless, round, elastomeric belts on the infeed conveyor 14 and the transit conveyor 18. The rear roller 286 of the discharge conveyor 48 has a drive gear 298 connected to a drive chain 294 that, in turn, is coupled to the drive motor 42 by a transfer chain 300. Accordingly, the rear roller 286 drives the conveyor belts 292 in the forward direction over the top of the support plate 290. Therefore, when the transfer cups 272 and 274 push the tortilla stack S to the discharged position, the tortilla stack slides onto the discharge conveyor 48, and the discharge conveyor moves the tortilla stack to the forward end of the discharge conveyor and onto the downward sloped exit ramp 49.

The downward sloped exit ramp 49 is mounted to the frame 16 adjacent to the forward roller 288 of the discharge conveyor 48 and inclined so the tortilla stack S slides down the inclined ramp to pick up station 50. Thereafter, the tortilla stack S can be manually or automatically moved to a packaging device to package the stack of counted and inspected tortillas.

As discussed above, the CPU 102 is programmed to control the device 10 in order to inspect, count, and stack tortillas, or other planar articles in tight and aligned stacks. The CPU 102 of the preferred embodiment contains and runs a computer routine 300 shown in FIGS. 10–14 to control the collating, inspecting, and stacking tortillas. The routine 300 controls the sensors 22, the rejection mechanism 26, the anti-jam system 140, and the stack remover 46 so as to result in 24 count stacks tortillas. The routine 300 can be modified to change the number of tortillas in a stack and to change the range of acceptable width and length of the tortillas.

Figure 10:
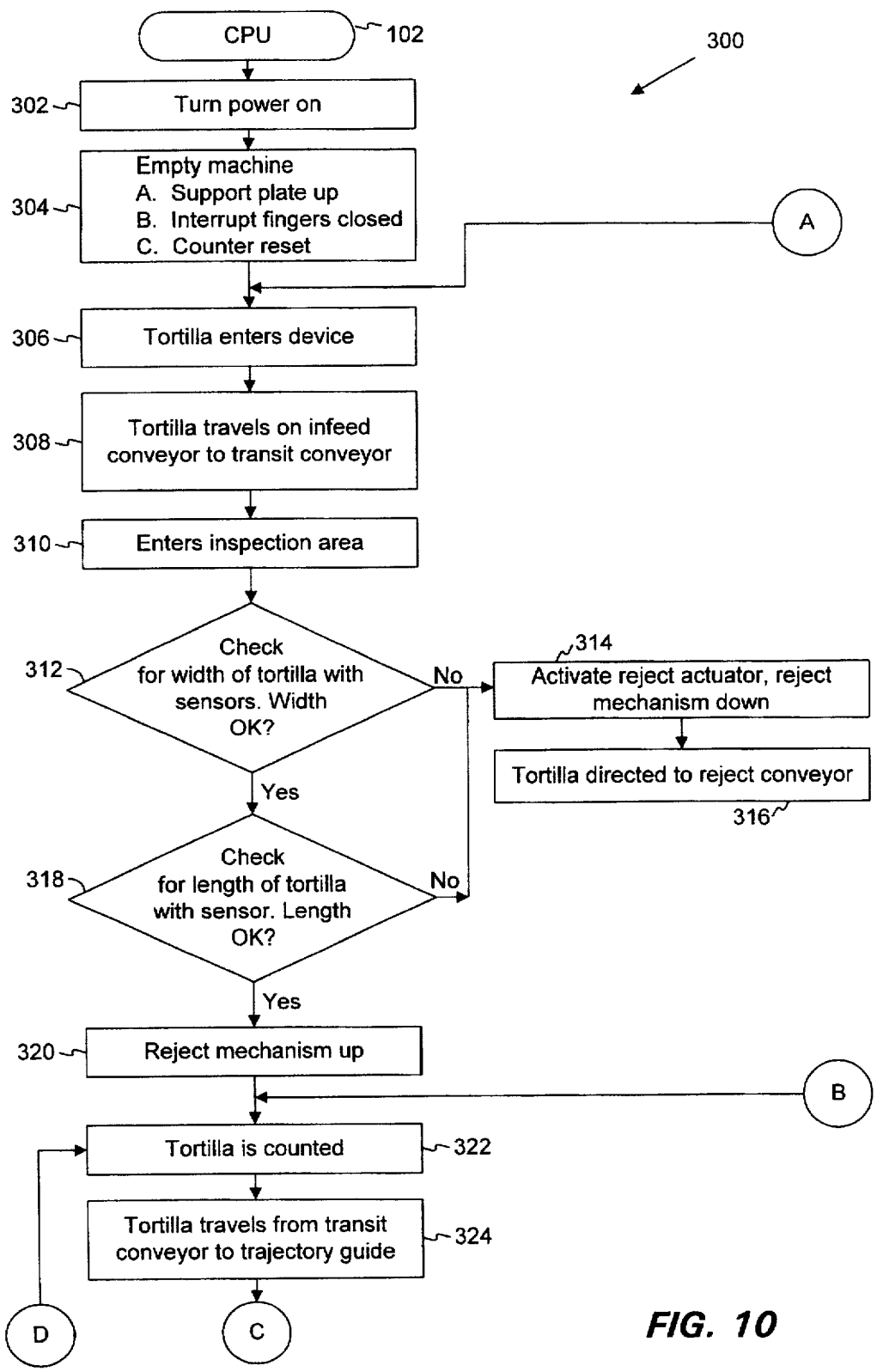
FIGS. 10-14 are flowcharts showing the software executed by the CPU in the preferred embodiment of the present invention of counting, inspecting, and stacking tortillas with the apparatus of FIG. 1.

As best seen in FIG. 10, the routine 300 is initiated when the CPU 102 is powered up in step 302 and the CPU performs a reset command in step 304. In the reset step 304, the device 10 is emptied of any excess tortillas by clearing the stacker 20 and moving the stack remover 46 to the discharge position to push the excess tortillas onto the discharge conveyor 48. Then the support plate 38 is moved to the raised position, the interrupt fingers 210 are moved to the extended position, and a counter of conventional construction in the CPU 102 is set or reset to zero.

After the reset step 304 is performed, the device 10 is ready to receive tortillas on the infeed conveyor 14, and a tortilla enters the infeed conveyor 14 in step 306. The tortilla travels on the infeed conveyor 14 to the transit conveyor 18 in step 308, and moves onto the transit conveyor. Once on the transit conveyor 18, the tortilla enters an inspection area in step 310 under the optic sensors 22, that including the center, left and right sensors 98, 104, and 106 mounted above the transit conveyor. The left and right sensors 104 and 106 inspect the width of the tortilla in step 312 to determine whether the width is within the predetermined range of acceptable widths for a tortilla. If the width of the tortilla is not within the acceptable range, the CPU 102 activates the pneumatic actuator 128 in step 314 and the actuator moves the rejection mechanism 26 to the lowered position. When the reject tortilla exits the transit conveyor 18 and enters the rejection mechanism 26, the reject tortilla is directed by the curved deflector 116 and slide 118 onto the reject conveyor 32 in step 316.

If the tortilla has an acceptable width, the center sensor 98 checks the length of the tortilla in step 318 to determine whether the tortilla has a length that is within the predetermined range of acceptable lengths. If the length of the tortilla is not within the predetermined range of acceptable lengths, the actuator 128 is activated in step 314 and it moves the rejection mechanism 26 to the lowered position, so the reject tortilla is directed to the reject conveyor 32 in step 316. If the width and length of the tortilla are within the acceptable ranges, the rejection mechanism 26 is either moved to the raised position if the rejection mechanism was in the lowered position or retained in the raised position in step 320 to allow the tortilla to move off of the transit conveyor 18 through the rejection mechanism 26 toward the stacker 20. After the width and length of the tortilla are checked and deemed acceptable in steps 312 and 318, the tortilla is counted in step 322 and 1 is added to the present value of the counter in the CPU. Accordingly, the counter keeps track of the number of acceptable tortillas being stacked in the stacker 20 so each resulting stack will have an accurate and consistent product count.

Figure 11:
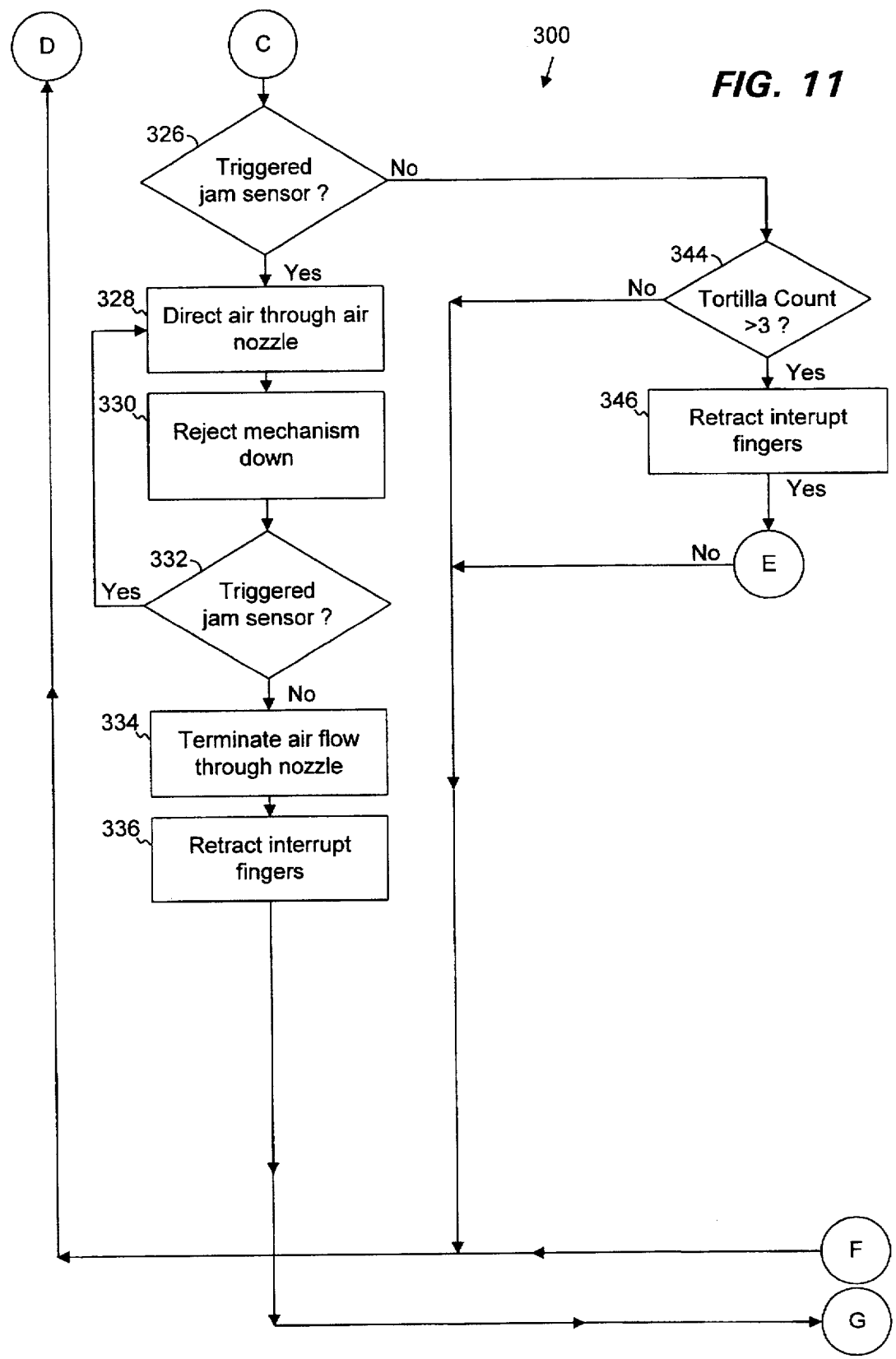

After the tortilla is counted in step 322, the tortilla travels along the transit conveyor 18, through the rejection mechanism 26 and onto the curved trajectory guide 24 in step 324. As best seen in FIG. 11, the jam sensor 142 positioned above the trajectory guide 24 is polled in step 326 and is triggered when a jam or other obstruction has occurred on the trajectory guide. If the jam sensor 142 detects a jam, the jam sensor provides a signal to the CPU 102 and the CPU activates the pressurized air source 130 to direct a blast of air through the air nozzle 144 in step 328 to clear the jam. In addition, the pneumatic actuator 128 connected to the rejection mechanism 26 is activated in step 330 and the rejection mechanism is moved to the lowered position so as to direct the tortillas on the transit conveyor 18 behind the jam downward onto the reject conveyor 32 until the jam is cleared.

In step 332, the jam sensor 142 is polled again to determine whether the jam has been cleared. If the jam sensor 142 continues to detect a jam, the routine 300 returns to step 328 and the blast of air through the air nozzle is continued. If the jam sensor 142 does not detect a jam in step 332 thereby indicating the jam has been cleared, the flow of pressurized air through the air nozzle 144 is terminated in step 334.

Figure 13:
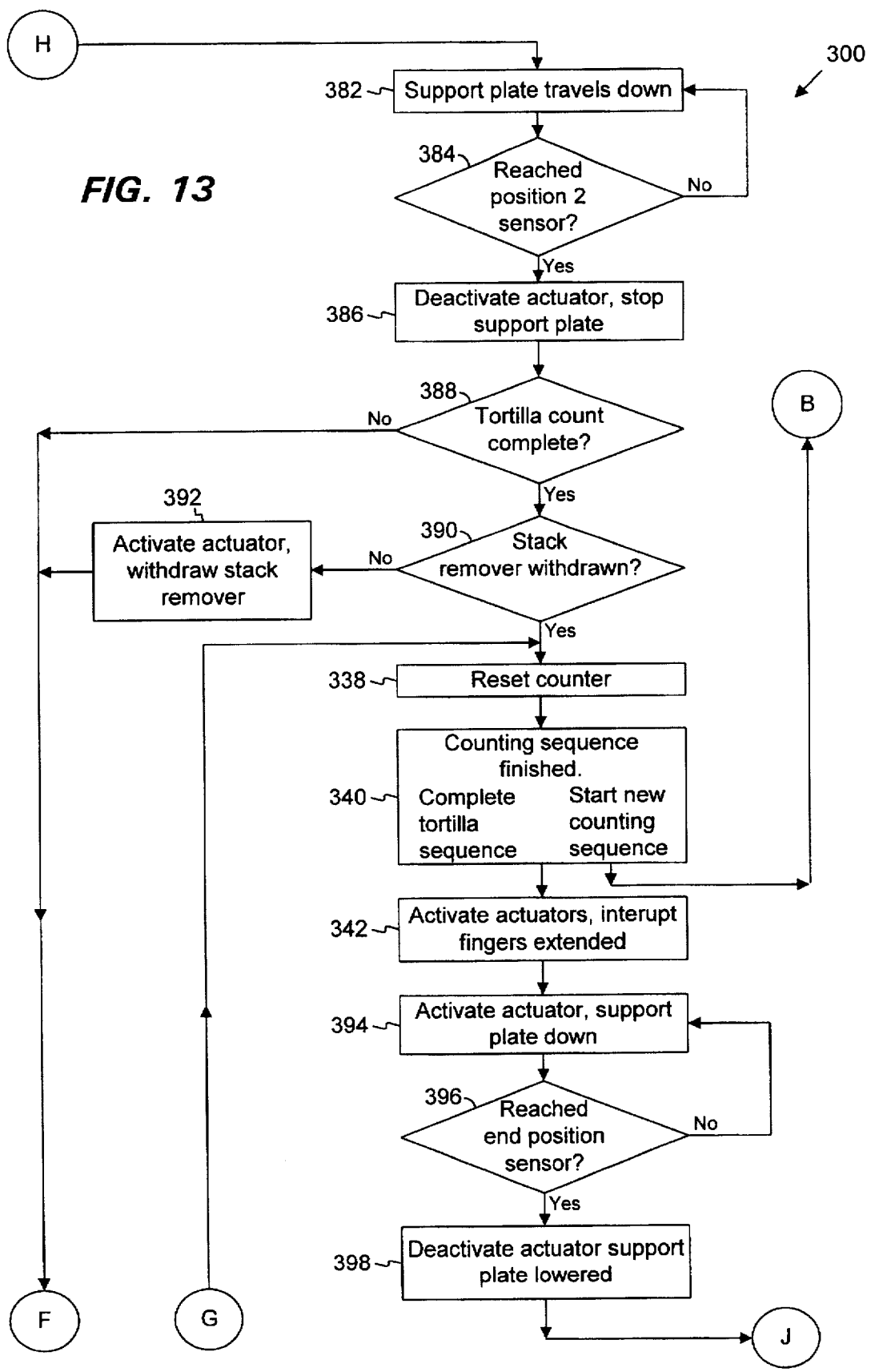

After the pressurized air flow is terminated, the actuators 208 and 209 coupled to the interrupt fingers 210 are activated to move the interrupt fingers from the extended position to the retracted position in step 336. Accordingly, the tortillas forming an aborted stack in the stacker 20 will be supported by the support plate 38. As best seen in FIG. 13, the counter is then reset to 0 in step 338 after a jam is cleared, and the counting sequence is completed in step 340. In addition, a new counting sequence is started in step 340 and the routine 300 returns to step 306 as another tortilla enters the device 10. At the same time the counting sequence is completed and restarted in step 340, the tortilla sequence is completed in step 340 and the front and rear actuators 208 and 209 are activated so as to move the interrupt fingers 210 to the extended position in step 342 to temporarily support subsequent tortillas landing in the stacker 20. As discussed in greater detail below, the support plate 38 is then moved to the lowered position and the stack remover 46 is moved from the withdrawn position to the discharge position so as to push the aborted stack of tortillas onto the discharge conveyor.

Referring back to FIG. 11, if the jam sensor 142 does not detect a jam in step 326, the counter is polled in step 344 to determine whether the tortilla count is greater than or less than 3. If the tortilla count in step 344 is not greater than 3, the routine 300 returns to step 322 in FIG. 10, and the next tortilla is counted and moved to the trajectory guide 24 in step 324. If the tortilla count is greater than 3 in step 344, the actuators 208 and 209 are activated and the interrupt fingers 210 are moved from the extended position to the retracted position in step 346 so the tortillas in the stacker 20 are supported by the support plate that is in the raised position. Thus, the first 4 tortillas of each stack will initially be supported by the interrupt fingers 210 and then moved onto support plate 38, thereby allowing the support plate to move to a desired position while the stack of tortillas is growing.

Figure 12:
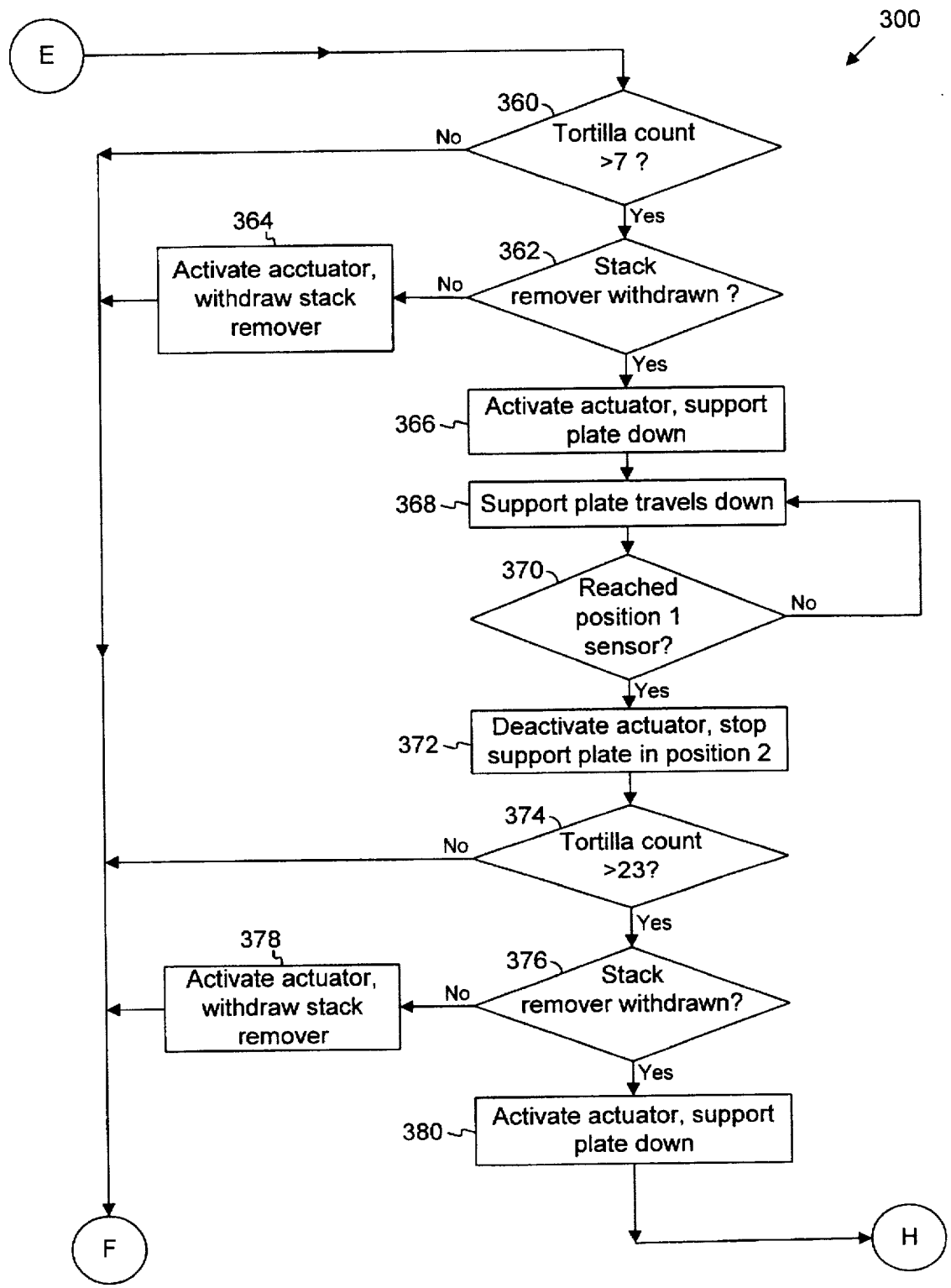

After the interrupt fingers 210 are retracted, the counter is polled in step 360, as best seen in FIG. 12, to determine whether the tortilla count is greater or less than 7. If the tortilla count is not greater than 7, the routine 300 returns to step 322 in FIG. 10 and the next tortilla is counted and moved along the transit conveyor 18. If the tortilla count in step 360 is greater than 7, the routine 300 determines in step 362 whether the stack remover 46 is retracted to the withdrawn position. If the stack remover 46 is not in the withdrawn position, the actuator 282 is activated in step 364 and the stack remover is moved to the withdrawn position so the stack remover will not interfere with the downward movement of the support plate 38. Thereafter, the sequence 300 returns to step 322 in FIG. 10 and the next tortilla is counted. Thereafter, the sequence 300 returns to step 322 in FIG. 10 and the next tortilla is counted.

If the stack remover 46 in step 362 is in the withdrawn position, the actuator 266 connected to the support plate 38 is activated in step 366 and the support plate is moved downwardly toward the first intermediate position in step 368. The first intermediate sensor of the sensors 270 coupled to the actuator 266 is polled in step 370 to determine whether the support plate 38 has reached the first intermediate position. If the support plate 38 has not reached the first intermediate position, the routine 300 returns to step 368 and the support plate continues its downward movement.

If the first intermediate sensor of the sensors 270 detects the support plate 38 is in the first intermediate position in step 370, the actuator 266 is deactivated and the downward motion of the support plate is stopped in step 372.

This sequence of moving the support plate 38 downwardly in incremental steps after a predetermined number of tortillas have been counted can be continued, and the number of incremental steps can be controlled by changing the threshold count number before the support plate is moved to the next intermediate position. Accordingly, the support plate 38 can be moved downwardly in incremental steps after individual tortillas are counted and stacked. In the alternative, the support plate 38 can be controlled so as to move downwardly in a continuous motion, as discussed above.

Returning to FIG. 12, after the support plate 38 is stopped in step 372 in the first intermediate position, the counter is polled in step 374 to determine how many tortillas are stacked in the stacker 20. If the tortilla count is not greater than 23, the sequence 300 returns to step 322 in FIG. 10. If the tortilla count in step 374 is greater than 23, the routine 300 determines in step 376 whether the stack remover 46 is in the withdrawn position. If the stack remover 46 is not in the withdrawn position in step 376, the actuator 282 is activated in step 378, and the stack remover is moved to the withdrawn position. The sequence 300 then returns to step 322 in FIG. 10 where the next tortilla is counted. If the stack remover 46 is in the withdrawn position in step 376, the actuator 266 connected to the support plate 38 is activated in step 380 and the support plate is moved downwardly in step 382, as shown in FIG. 13.

As the support plate 38 is moved downwardly in step 382, the second intermediate sensor of the sensors 270 is polled in step 384 to determine whether the support plate has reached the second intermediate position. If the support plate 38 has not reached the second intermediate position in step 384, the support plate continues its downward movement. If the support plate 38 has reached the second intermediate position in step 384, the actuator 266 stops the downward motion of the support plate in step 386. Thereafter, the counter is polled in step 388 to determine whether the tortilla count is complete. In the preferred embodiment, the tortilla count is complete when 24 tortillas have been counted and stacked. Although the illustrated embodiment has a complete tortilla count at 24, the number of tortillas required to have a complete tortilla stack in step 388 can be changed as desired to increase or decrease the product count in each stack of inspected tortillas.

If the tortilla count is not complete in step 388, the routine 300 returns to step 322 in FIG. 10, and the next tortilla is counted as discussed above. If the tortilla count is complete in step 388, the location of the stack remover 46 is determined in step 390. If the stack remover 46 is not in the withdrawn position in step 390, the actuator 282 is activated and the stack remover is moved to the withdrawn position in step 392. Thereafter, the routine 300 returns to step 322 in FIG. 10. If the stack remover 46 is in the withdrawn position in step 390, the counter is reset to 0 in step 338 and the counting sequence is finished in step 340. Thereafter, also in step 340, a new counting sequence is started and the routine 300 returns to step 306, in FIG. 10, with the tortillas entering the device 10 on the infeed conveyor 14.

Also in step 340 the tortilla sequence is complete such that the stack of tortillas is either a complete stack with 24 tortillas or an aborted stack from steps 326–336 discussed above. Once the tortilla sequence is complete, the actuators 208 and 209 are activated in step 342 so as to move the interrupt fingers 210 from the retracted position to the extended position, thereby temporarily supporting tortillas entering the stacker 20. Then the actuator 266 connected to the support plate 38 is activated in step 394 and the support plate with the stack of tortillas thereon is moved downwardly to the lowered position.

The bottom sensor of the sensors 270 coupled to the actuator 266 is polled in step 396 to determine whether the support plate 38 is in the lowered position. If the support plate 38 is not in the lowered position, the routine 300 returns to step 394 and the support plate continues its downward motion. If the support plate 38 is in the lowered position in step 396, the actuator 266 is deactivated in step 398 and the support plate 38 is stopped in the lowered position with the stack of tortillas positioned on the top surface of the receiving plate 44, as discussed above.

In the illustrated embodiment, the third intermediate sensor of the sensors 270 is not activated because it is positioned such that it is not needed when the tortilla stacks are 24 count stacks or less. However, the routine 300 can be modified to stack more than 24 tortillas per stack. Accordingly, the routine includes steps similar to steps 360–372 or steps 374–386, and when a tortilla count is greater than 24, the third intermediate sensor is polled to determine whether the support plate 38 has reached the third intermediate position.

Figure 14:
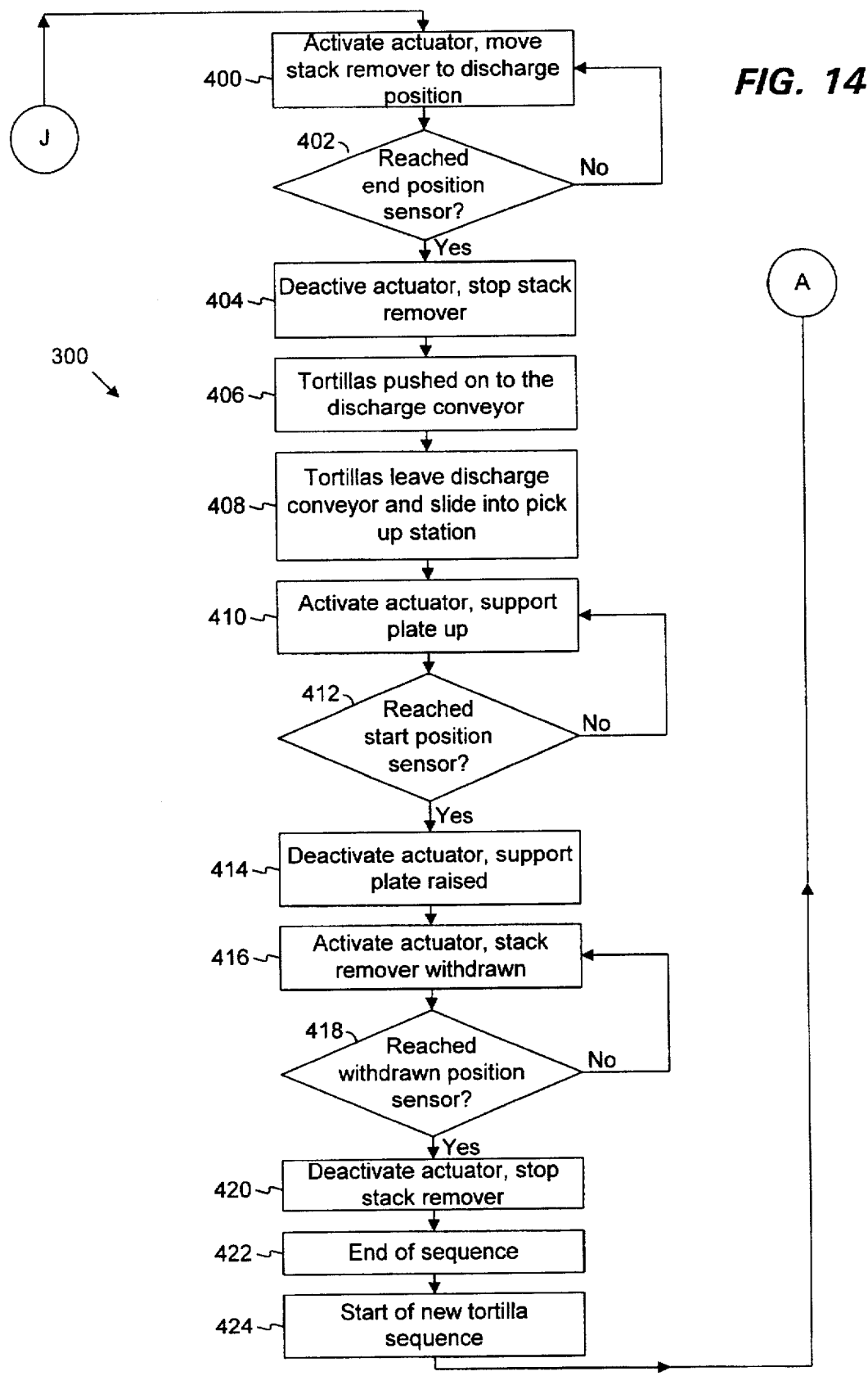

As best seen in FIG. 14 and with the support plate 38 in the lowered position and the stack of tortillas on the receiving plate 44, the actuator 282 connected to the stack remover 46 is activated in step 400 so as to move the stack remover toward the discharge position. In step 402, an end position sensor coupled to the actuator 282 is polled to determine whether the stack remover 46 is in the discharge position. If the stack remover 46 is not in the discharge position, the routine 300 returns to step 400 and the stack remover continues its outward movement toward the discharge position, thereby pushing the stack of tortillas over the receiving plate 44. If the stack remover 46 is in the discharge position in step 402, the actuator 282 is deactivated in step 404 so as to retain the stack remover in the discharge position. Accordingly, the stack of tortillas is pushed over the receiving plate 44 onto the discharge conveyor 48 in step 406 and the stack exits the discharge conveyor onto the exit ramp 49 and slides to the pickup station 50 in step 408.

When the stack remover 46 is in the discharge position, the actuator 266 connected to the support plate 38 is activated in step 410 and the support plate is moved upwardly from the lowered position toward the raised position. A start position sensor of the sensors 270 is polled in step 412 to determine whether the support plate 38 has reached the raised position. If the support plate 38 is not in the raised position, the routine 300 returns to step 410 and the support plate continues its upward movement. If the support plate 38 is in the raised position in step 412, the actuator 266 is deactivated in step 414 to stop the support plate 38 in the raised position. In the preferred embodiment, the tortillas continue to stack in the stacker as the stack remover 46 pushes a stack onto the discharge conveyor 48, and the support plate 38 is returned to the raised position by the time next stack contains 4 tortillas.

After the support plate 38 has been moved to the raised position in step 410, the actuator 288 connected to the stack remover 46 is activated in step 416 and the stack remover is moved from the discharge position to the withdrawn position. When the stack remover 46 is in the withdrawn position, a sensor coupled to the actuator 282 indicates the stack remover has reached the withdrawn position. The sensor is polled in step 418 to determine the position of the stack remover 46. If the stack remover 46 is not in the withdrawn position, the routine 300 returns to step 416 and the stack mover continues its movement toward the withdrawn position. If the sensor detects in step 418 that the stack remover 46 is in the withdrawn position, the actuator 282 is deactivated and the stack remover stops in step 420.

When the actuator 282 is deactivated at step 420, the end of a sequence occurs at step 422 whereby a completed and aligned stack of tortillas has been counted, inspected, and move to the pickup station. Thereafter, a new tortilla sequence is started at step 424 and the routine 300 returns to the beginning with the new tortillas entering the device at step 306.

It will be appreciated that, although specific embodiments of the invention have been described herein for purposes of illustration, various modifications may be made without departing from the spirit and scope of the invention. For example, the pneumatic actuators could be electric actuators that are controlled by the CPU, and the computer routine could be modified to control the sequence of actions completed by the device. Accordingly, the invention is not limited except as by the appended claims.

We claim:

1. An apparatus for counting, inspecting, and stacking flexible, generally planar articles, comprising:

a conveyor having a receiving end and a discharge end opposite said receiving end, said conveyor receiving said planar articles thereon at said receiving end and moving said planar articles toward said discharge end where said planar articles are discharged from said conveyor;

a first sensor between said receiving and discharge ends of said conveyor, said first sensor being positioned to count said planar articles moving along said conveyor;

a trajectory guide positioned at said discharge end of said conveyor to guide said planar articles and into a flight trajectory away from said discharge end of said conveyor;

a stacking assembly positioned a predetermined distance from said trajectory guide so said planar articles fly from said trajectory guide along said flight trajectory and land in said stacking assembly to form a stack of said planar articles;

a shaker device attached to said stacking assembly for shaking said stacking assembly to jostle said stack so said planar articles form an aligned stack; and a stack removal device positioned below said stacking assembly and positioned to receive said aligned stack having a predetermined number of said planar articles therein and to move said aligned stack away from said stacking assembly to a discharge position.

2. The apparatus of claim 1 wherein said trajectory guide is curved, said curved trajectory guide having a leading edge above said stacking assembly and sides that are curved upward so said leading edge has an arcuate shape, said carved trajectory guide being shaped to bend each of said planar articles into an arcuate position with sides of said planar article curved upward so a leading edge portion of said planar article resists bending upward or downward as said planar article moves along said flight trajectory toward said stacking assembly.

3. The apparatus of claim 1, further comprising second and third sensors, and wherein each of said planar articles have a length and a width, said first sensor detecting said length of each of said planar articles to determine whether said length is within a predetermined range of acceptable lengths or whether said length is outside said range of acceptable lengths and thus identifying said planar article as a reject article, and said second and third sensors detecting said width of each of said planar articles to determine whether said width is within a predetermined range of acceptable widths or whether said width is outside said range of acceptable widths and thus identifying said planar article as a reject article.

4. The apparatus of claim 1, further comprising:

a jam-sensor coupled to said trajectory guide to detect when one or more of said planar articles is blocked, thereby forming a jam; and a jam-removing device connected to said jam-sensor and adapted to clear said one or more of said planar articles from said trajectory guide when said jam-sensor detects a jam.

5. The apparatus of claim 4 wherein said jam-removing device is an air nozzle attached to a pressurized air source and aimed at said trajectory guide to direct a blast of air at said trajectory guide to clear said jam.

6. The apparatus of claim 1 wherein said stacking assembly is positioned above a base plate and includes:

a housing forming a stacking area shaped and sized to correspond to a shape and size of said planar articles, said stacking area positioned to receive said planar article landing in said stacking assembly;

a support plate in said stacking area to support said stack of said planar articles, said support plate being movable between a raised position within said stacking area and a lowered position, said support plate moves downward from said raised position as said planar articles stack onto said support plate so said flight trajectory of each of said planar articles from said trajectory guide to said stacking area remains substantially the same; and a drive mechanism connected to said support plate to move said support plate between said raised and lowered positions.

7. The apparatus of claim 6 wherein said housing is an adjustable housing that can be adjusted to increase or decrease the size of said stacking area to correspond to a predetermined size of said planar articles.

8. An apparatus for counting, inspecting, and stacking flexible, generally planar articles, comprising:

a conveyor having a receiving end and a discharge end opposite said receiving end, said conveyor receiving said planar articles thereon at said receiving end and moving said planar articles toward said discharge end where said planar articles are discharged from said conveyor;

a motor driving said conveyor so said conveyor moves from said receiving end toward said discharge end;

a first sensor between said receiving and discharge ends of said conveyor, said first sensor being positioned to count said planar articles moving along said conveyor;

a trajectory guide positioned at said discharge end of said conveyor to guide said planar articles and into a flight trajectory away from said discharge end of said conveyor;

a stacking assembly positioned a predetermined distance from said trajectory guide so said planar articles fly from said trajectory guide along said flight trajectory and land in said stacking assembly to form a stack of said planar articles;

a stack removal device positioned below said stacking assembly and positioned to receive said stack having a predetermined number of said planar articles therein and to move said stack away from said stacking assembly to a discharge position; and a shaker device attached to said stacking assembly to jostle said stack so said planar articles are arranged in an aligned stack.

9. The apparatus of claim 8 wherein said trajectory guide is curved, said curved trajectory guide having a leading edge above said stacking assembly and sides that are curved upward so said leading edge has an arcuate shape, said curved trajectory guide being shaped to bend each of said planar articles into an arcuate position with sides of said planar article curved upward so a leading-edge portion of said planar article resists bending upward or downward as said planar article moves along said flight trajectory toward said stacking assembly.

10. The apparatus of claim 8 wherein said stacking assembly has a stacking area therein shaped and sized to correspond to a shape and size of said planar articles, said stacking assembly being adjustable to change said size of said stacking area.

11. The apparatus of claim 8, further comprising second and third sensors, and wherein each of said planar articles have a length and a width, said first sensor detecting said length of each of said planar articles to determine whether said length is within a predetermined range of acceptable lengths or whether said length is outside said range of acceptable lengths and thus identifying said planar article as a reject article, and said second and third sensors detecting said width of each of said planar articles to determine whether said width is within a predetermined range of acceptable widths or whether said width is outside said range of acceptable widths and thus identifying said planar article as a reject article.

12. The apparatus of claim 11 wherein said first, second, and third sensors are optical sensors.

13. The apparatus of claim 12, further comprising a rejection mechanism positioned between said discharge end of said conveyor and said trajectory guide, said rejection mechanism coupled to said first, second, and third sensors and positioned to direct said reject articles away from said trajectory guide.

14. The apparatus of claim 13 wherein said rejection mechanism includes a reject discharge assembly movable between first and second positions, said first position directing said planar articles onto said trajectory guide, and said second position directing said planar articles along a reject path away from said trajectory guide, said rejection mechanism moving from said first position to said second position when said one of said first, second, and third sensors detects a said reject article.

15. The apparatus of claim 14 wherein said rejection mechanism further includes a curved deflector forward of said reject discharge assembly, said curved deflector positioned to direct said rejected article downward along said reject path.

16. The apparatus of claim 8, further comprising:
a jam-sensor coupled to said trajectory guide to detect when one or more of said planar articles is blocked, thereby forming a jam; and
a jam-removing device connected to said jam-sensor and adapted to clear said one or more of said planar articles from said trajectory guide when said jam-sensor detects a jam.

17. The apparatus of claim 16 wherein said jam-removing device is an air nozzle attached to a pressurized air source and aimed at said trajectory guide to direct a blast of air at said trajectory guide to clear said jam.

18. The apparatus of claim 8 wherein said stacking assembly is positioned above a base plate and includes:
a housing forming a stacking area shaped and sized to correspond to a shape and size of said planar articles, said stacking area positioned to receive said planar article landing in said stacking assembly;
a support plate in said stacking area to support said stack of said planar articles, said support plate being movable between a raised position within said stacking area and a lowered position, said support plate moves downward from said raised position as said planar articles stack onto said support plate so said flight trajectory of each of said planar articles from said trajectory guide to said stacking area remains substantially the same; and
a drive mechanism connected to said support plate to move said support plate between said raised and lowered positions.

19. The apparatus of claim 18 wherein said housing is an adjustable housing that can be adjusted to increase or decrease the size of said stacking area to correspond to a predetermined size of said planar articles.

20. The apparatus of claim 18 wherein said support plate moves incrementally from said raised position toward said lowered position.

21. The apparatus of claim 18 wherein said drive mechanism and support plate are coupled to said first sensor and said drive mechanism moves said support plate toward said lowered position after a predetermined number of planar articles have been counted by said first sensor and stacked in said stacking area.

22. The apparatus of claim 18, further including a discharge conveyor below said stack assembly to receive said aligned stack at said discharge position and move said aligned stack away from said discharge position.

23. The apparatus of claim 18 wherein said stacking assembly further includes a plurality of movable support members in said housing that move between an extended position and a withdrawn position, said movable supports being positioned within said stacking area above said support plate when in said extended position to form a temporary support area that will support said planar articles in said stacking area when said support plate is in said lowered position, and said movable support members being retracted from said stacking area when in said withdrawn position so said movable support members will be clear of said stacking area.

24. An apparatus for counting, inspecting, and stacking generally planar articles, comprising:
a conveyor having a receiving end and a discharge end opposite said receiving end, said conveyor receiving said planar articles thereon at said receiving end and moving said planar articles toward said discharge end where said planar articles are discharged from said conveyor;
a motor driving said conveyor so said conveyor moves from said receiving end toward said discharge end;
a trajectory guide positioned at said discharge end of said conveyor to guide said planar articles into a flight trajectory away from said discharge end of said conveyor;
a jam-sensor coupled to said trajectory guide to detect when one or more of said planar articles is blocked, thereby forming a jam;
a jam-removing device connected to said jam-sensor and adapted to clear said one or more of said planar articles from said trajectory guide when said jam-sensor detects a jam;
a stacking assembly positioned a predetermined distance from said trajectory guide so said planar articles fly from said trajectory guide along said flight trajectory and land in said stacking assembly to form a stack of said planar articles; and
a stack removal device positioned below said stacking assembly and positioned to receive said aligned stack having a predetermined number of said planar articles therein and to move said stack away from said stacking assembly to a discharge position.

25. The apparatus of claim 24 wherein said jam-removing device is an air nozzle attached to a pressurized air source and aimed at said trajectory guide to direct a blast of air at said trajectory guide to clear said jam.

26. The apparatus of claim 24 wherein said trajectory guide is curved, said curved trajectory guide having a leading edge above said stacking assembly and sides that are curved upward so said leading edge has an arcuate shape, said curved trajectory guide being shaped to bend each of said planar articles into an arcuate position with sides of said planar article curved upward so a leading edge portion of said planar article resists bending upward or downward as said planar article moves along said flight trajectory toward said stacking assembly.

27. The apparatus of claim 24 wherein said stacking assembly has a stacking area therein shaped and sized to correspond to a shape and size of said planar articles, said stacking assembly being adjustable to change said size of said stacking area.

28. The apparatus of claim 24 further comprising a rejection mechanism including a reject discharge assembly movable between first and second positions, said first position directing said planar articles onto said trajectory guide, and said second position directing said planar articles along a reject path away from said trajectory guide.

29. The apparatus of claim 28 wherein said rejection mechanism further includes a curved deflector forward of said reject discharge assembly, said curved deflector being adapted to redirect said rejected article downward along said reject path away from said conveyor.

30. The apparatus of claim 24, further comprising a first sensor positioned between said receiving and discharge ends of said conveyor, said sensors being positioned to count said planar articles moving along said conveyor.

31. The apparatus of claim 30, further comprising second and third sensors and wherein each of said planar articles have a length and a width, said first sensor detecting said length of each of said planar articles to determine whether said length is within a predetermined range of acceptable lengths or whether said length is outside said range of acceptable lengths and thus identifying said planar article as a reject article, and said second and third sensors detecting said width of each of said planar articles to determine whether said width is within a predetermined range of acceptable widths or whether said width is outside said range of acceptable widths and thus identifying said planar article as a reject article.

32. The apparatus of claim 30 wherein said first, second, and third sensors are optical sensors.

33. The apparatus of claim 24 wherein said conveyor includes a first conveyor belt and a second conveyor belt above said first conveyor belt in a back-to-back arrangement, each of said first and second conveyor belts having top and bottom sides, said first and second conveyor belts move with said top surface of said first conveyor belt moving in a same direction and at substantially the same speed as said bottom surface of said second belt so said planar articles are moved between said first and second conveyor belts.

34. An apparatus for moving and stacking generally planar articles, comprising:
an infeed conveyor having a first end and a second end, said infeed conveyor positioned to receive said planar articles at said first end and to move said planar articles to said second end;

adjustable alignment guides adjacent to said infeed conveyor and positioned to laterally displace said planar articles on said infeed conveyor as said planar articles move from said first end toward said second end so each of said planar articles is positioned at a predetermined lateral position on said infeed conveyor at said second end when said each of said planar articles reach said second end, said alignment guides being movable laterally to adjust said predetermined lateral position;

a transit conveyor having a receiving end and a discharge end, said receiving end being forward of said second end of said infeed conveyor so said transit conveyor receives said planar articles at said receiving end from said infeed conveyor and moves said planar articles to said discharge end where said planar articles are discharged from said transit conveyor;

a motor driving said infeed and transit conveyors;

a trajectory guide positioned at said discharge end of said transit conveyor to guide said planar articles into a flight trajectory away from said discharge end;

a stacking assembly positioned a predetermined distance from said trajectory guide so said planar articles fly from said trajectory guide along said flight trajectory and land in said stacking assembly to form an aligned stack of said planar articles; and a stack removal device positioned below said stacking assembly, said stack removal device receives said aligned stack having a predetermined number of said planar articles therein and moves said aligned stack away from said stacking assembly to a discharge position.

35. The apparatus of claim 34 wherein said adjustable alignment guides include first and second guide plates a known distance apart from each other and on opposite sides of said infeed conveyor, said first or second guide plates being adjustable to change said known distance therebetween.

36. The apparatus of claim 34 wherein said infeed conveyor is an inclined conveyor adjustable to a plurality of incline angles.

37. The apparatus of claim 34 wherein said trajectory guide is curved, said curved trajectory guide having a leading edge above said stacking assembly and sides that are curved upward so said leading edge has an arcuate shape, said curved trajectory guide shaped to bend each of said planar articles into an arcuate position with sides of said planar article being curved upward so a leading edge portion of said planar article resists bending upward or downward as said planar article moves along said flight trajectory toward said stacking assembly.

38. The apparatus of claim 34 wherein said stacking assembly has a stacking area therein shaped and sized to correspond to a shape and size of said planar articles, said stacking assembly being adjustable to change said size of said stacking area.

39. The apparatus of claim 34, further comprising:
a plurality of sensors positioned between said receiving and discharge ends of said transit conveyor, said sensors being positioned to count said planar articles moving along said transit conveyor and to detect said planar articles that fail to meet predetermined quality standards, thereby performing a quality control check and detecting reject articles; and a rejection mechanism positioned between said discharge end of said transit conveyor and said trajectory guide, said reject mechanism being coupled to said sensors and positioned to direct said reject articles away from said trajectory guide.

40. The apparatus of claim 39 wherein each of said planar articles have a length and a width and said sensors include a first sensor that detects the length of the articles passing along said transit conveyor to determine whether the length of said article is within a set range of acceptable lengths, and second and third sensors that detect the width of the article to determine whether the width of said article is within a set range of acceptable widths.

41. The apparatus of claim 39 wherein said rejection mechanism includes a reject discharge assembly movable between first and second positions, said first position directing said planar articles onto said trajectory guide, and said second position directing said planar articles along a reject path away from said trajectory guide, said rejection mechanism moving from said first position to said second position when said one of said sensors detects a said reject article.

42. The apparatus of claim 34, further comprising:
    a jam-sensor coupled to said trajectory guide to detect when one or more of said planar articles is blocked, thereby forming a jam; and
    a jam-removing device connected to said jam-sensor and adapted to clear said one or more of said planar articles from said trajectory guide when said jam-sensor detects a jam.

43. The apparatus of claim 42 wherein said jam-removing device is an air nozzle attached to a pressurized air source and aimed at said trajectory guide to direct a blast of air at said trajectory guide to clear said jam.

44. The apparatus of claim 34, further comprising a shaker device attached to said stacking assembly to shake said stacking assembly to jostle said stack so said planar articles are arranged in an aligned stack.

45. An apparatus for counting, inspecting, and stacking flexible, generally planar articles, each of said planar articles have a length and a width, comprising:
    a conveyor having a receiving end and a discharge end opposite said receiving end, said conveyor receiving said planar articles thereon at said receiving end and moving said planar articles toward said discharge end where said planar articles are discharged from said conveyor;
    a motor driving said conveyor so said conveyor moves from said receiving end toward said discharge end;
    a first sensor between said receiving and discharge ends of said conveyor, said first sensor being positioned to count said planar articles moving along said conveyor, said first sensor detecting said length of each of said planar articles to determine whether said length is within a predetermined range of acceptable lengths or whether said length is outside said range of acceptable lengths and thus identifying said planar article as a reject article;
    a second sensor positioned to detect said width of each of said planar articles to determine whether said width is within a predetermined range of acceptable widths or whether said width is outside said range of acceptable widths and thus identifying said planar article as a reject article;
    a trajectory guide positioned at said discharge end of said conveyor to guide said planar articles and into a flight trajectory away from said discharge end of said conveyor;
    a stacking assembly positioned a predetermined distance from said trajectory guide so said planar articles fly from said trajectory guide along said flight trajectory and land in said stacking assembly to form a stack of said planar articles; and a rejection mechanism positioned between said discharge end of said conveyor and said trajectory guide, said rejection mechanism coupled to said first and second sensors and positioned to direct said reject articles away from said trajectory guide.

46. The apparatus of claim 45 wherein said rejection mechanism includes a reject discharge assembly movable between first and second positions, said first position directing said planar articles onto said trajectory guide, and said second position directing said planar articles along a reject path away from said trajectory guide, said rejection mechanism moving from said first position to said second position when said one of said first and second sensors detects said reject article.

47. The apparatus of claim 46 wherein said rejection mechanism further includes a curved deflector forward of said reject discharge assembly, said curved deflector positioned to direct said rejected article downward along said reject path.

48. An apparatus for counting, inspecting, and stacking flexible, generally planar articles, comprising:
    a conveyor having a receiving end and a discharge end opposite said receiving end, said conveyor receiving said planar articles thereon at said receiving end and moving said planar articles toward said discharge end where said planar articles are discharged from said conveyor;
    a motor driving said conveyor so said conveyor moves from said receiving end toward said discharge end;
    a first sensor between said receiving and discharge ends of said conveyor, said first sensor being positioned to count said planar articles moving along said conveyor;
    a trajectory guide positioned at said discharge end of said conveyor to guide said planar articles and into a flight trajectory away from said discharge end of said conveyor;
    a stacking assembly positioned a predetermined distance from said trajectory guide so said planar articles fly from said trajectory guide along said flight trajectory and land in said stacking assembly to form a stack of said planar articles, said stacking assembly being positioned above a base plate and including:
        a housing forming a stacking area shaped and sized to correspond to a shape and size of said planar articles, said stacking area positioned to receive said planar article landing in said stacking assembly, said housing being an adjustable housing that is adjustable to increase or decrease the size of said stacking area to correspond to a predetermined size of said planar articles;
        a support plate in said stacking area to support said stack of said planar articles, said support plate being movable between a raised position within said stacking area and a lowered position, said support plate moves downward from said raised position as said planar articles stack onto said support plate so said flight trajectory of each of said planar articles from said trajectory guide to said stacking area remains substantially the same; and
        a drive mechanism connected to said support plate to move said support plate between said raised and lowered positions; and
    a stack removal device positioned below said stacking assembly and positioned to receive said aligned stack having a predetermined number of said planar articles therein and to move said aligned stack away from said stacking assembly to a discharge position.

* * * * *